United States Patent
Shinotsuka et al.

(10) Patent No.: US 8,000,198 B2
(45) Date of Patent: Aug. 16, 2011

(54) PHASE-CHANGE TYPE OPTICAL RECORDING MEDIUM AND REPRODUCTION METHOD AND APPARATUS FOR SUCH A RECORDING MEDIUM

(75) Inventors: Michiaki Shinotsuka, Kanagawa (JP); Masaru Shinkai, Kanagawa (JP); Hiroyoshi Sekiguchi, Kanagawa (JP); Eiko Hibino, Kanagawa (JP); Masaki Kato, Kanagawa (JP); Katsuyuki Yamada, Kanagawa (JP); Masahiko Nakayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 920 days.

(21) Appl. No.: 11/658,346

(22) PCT Filed: May 19, 2006

(86) PCT No.: PCT/JP2006/010516
§ 371 (c)(1),
(2), (4) Date: Jan. 24, 2007

(87) PCT Pub. No.: WO2006/132096
PCT Pub. Date: Dec. 14, 2006

(65) Prior Publication Data
US 2007/0237062 A1    Oct. 11, 2007

(30) Foreign Application Priority Data

| Jun. 6, 2005 | (JP) | 2005-166269 |
| Jun. 9, 2005 | (JP) | 2005-166268 |
| Nov. 30, 2005 | (JP) | 2005-347375 |
| Jan. 27, 2006 | (JP) | 2006-019730 |

(51) Int. Cl.
*G11B 11/00* (2006.01)
(52) U.S. Cl. ........................ 369/53.28; 369/94
(58) Field of Classification Search .................. None
See application file for complete search history.

(56) References Cited

U.S. PATENT DOCUMENTS

| 6,524,766 | B1 * | 2/2003 | Ariyoshi et al. | 430/270.13 |
| 6,741,545 | B2 | 5/2004 | Shinotsuka et al. | |
| 6,790,504 | B2 | 9/2004 | Shinotsuka et al. | |
| 6,801,240 | B2 | 10/2004 | Abe et al. | |
| 7,009,930 | B1 * | 3/2006 | Uno et al. | 369/275.2 |

(Continued)

FOREIGN PATENT DOCUMENTS

CN    1577546 A    2/2005

(Continued)

OTHER PUBLICATIONS

"DVD+ReWritable and How it Works" Royal Philips Electronics N.V., The Netherlands, pp. 1-8, Aug. 1999.

(Continued)

*Primary Examiner* — Paul Huber
(74) *Attorney, Agent, or Firm* — Dickstein Shapiro LLP

(57) ABSTRACT

A dual-layer structure phase-change type optical recording medium includes a substrate (1), a reflective layer (2), a first protective layer (3), a first recording layer (4), a second protective layer (5), a resin intermediate layer (6), a third protective layer (7), a heat release layer (8) made of Cu or a Cu alloy, a fourth protective layer (9), a second recording layer (10), a fifth protective layer (11) and a cover substrate (12). A product of a reflectance of a high-reflection part and a modulation after recording is a value equal to or higher than a lower limit value for reproduction.

7 Claims, 13 Drawing Sheets

U.S. PATENT DOCUMENTS

| | | |
|---|---|---|
| 2001/0016242 A1 | 8/2001 | Miyamoto et al. |
| 2001/0030915 A1 | 10/2001 | Suzuki |
| 2003/0008236 A1 | 1/2003 | Yamada et al. |
| 2004/0037203 A1 | 2/2004 | Harigaya et al. |
| 2004/0058542 A1 | 3/2004 | Ide et al. |
| 2004/0076908 A1 | 4/2004 | Oomachi et al. |
| 2004/0115386 A1 | 6/2004 | Shinkai et al. |
| 2005/0007938 A1 | 1/2005 | Shinotsuka |
| 2006/0133258 A1 | 6/2006 | Yamada et al. |

FOREIGN PATENT DOCUMENTS

| | | |
|---|---|---|
| EP | 1 189 216 | 3/2002 |
| EP | 1 280 142 | 1/2003 |
| JP | 61-258787 | 11/1986 |
| JP | 62-152786 | 7/1987 |
| JP | 63-039140 | 2/1988 |
| JP | 64-63195 | 3/1989 |
| JP | 1-211249 | 8/1989 |
| JP | 6-60426 | 3/1994 |
| JP | 11-134652 | 5/1999 |
| JP | 2000-11400 | 1/2000 |
| JP | 2000-228049 | 8/2000 |
| JP | 2001-101680 | 4/2001 |
| JP | 2001-202632 A | 7/2001 |
| JP | 2002-515623 | 5/2002 |
| JP | 2003-091825 | 3/2003 |
| JP | 2003-335064 | 11/2003 |
| JP | 2004-185794 | 7/2004 |
| JP | 2005-50410 | 2/2005 |
| JP | 2005-310275 A | 11/2005 |
| WO | WO 00/23990 | 4/2000 |

OTHER PUBLICATIONS

Schep et al., "Format Description and Evaluation of the 22.5 GB DVR Disc" ISOM Technical Digest, pp. 210-211, 2000.

Akahira et al., "High Density Recording on Phase Change Optical Disks" SPIE, vol. 2514, pp. 294-301, 1995.

Kurokawa et al., "A 41.8GB Double-Decker Phase Change Disc" Optical Data Storage Topical Meeting, Santa Fe, New Mexico, pp. 28-30, Apr. 2001.

\* cited by examiner

FIG.4

| SAMPLE NO. | TOTAL (nm) | FIFTH PROTECTIVE LAYER FIRST | FIFTH PROTECTIVE LAYER SECOND | FIFTH PROTECTIVE LAYER THIRD | FIFTH PROTECTIVE LAYER FOURTH | SECOND RECORDING LAYER 10 | FOURTH PROTECTIVE LAYER 9 | HEAT RELEASE LAYER 8 | THIRD PROTECTIVE LAYER 7 | SUBSTRATE BAKE | SUBSTRATE (1) (2) (3) |
|---|---|---|---|---|---|---|---|---|---|---|---|
| L0A | 220 | 60 | 60 | 60 | 40 | 7 | 20 | 7 | 70 | 60°C 24h | (1) |
| L0B | 220 | 60 | 60 | 60 | 40 | 7 | 20 | 8 | 70 | ← | (1) |
| L0C | 220 | 60 | 60 | 60 | 40 | 7 | 20 | 7 | 90 | ← | (1) |
| L0D | 220 | 60 | 60 | 60 | 40 | 7 | 20 | 8 | 90 | ← | (1) |
| L0E | 220 | 60 | 60 | 60 | 40 | 7 | 20 | 7 | 100 | ← | (1) |
| L0F | 220 | 60 | 60 | 60 | 40 | 7 | 20 | 8 | 100 | ← | (1) |
| L0G | 220 | 60 | 60 | 60 | 40 | 7 | 20 | 7 | 110 | ← | (1) |
| L0H | 220 | 60 | 60 | 60 | 40 | 7 | 20 | 8 | 110 | ← | (1) |
| L0I | 220 | 60 | 60 | 60 | 40 | 8 | 20 | 7 | 70 | ← | (1) |
| L0J | 220 | 60 | 60 | 60 | 40 | 8 | 20 | 8 | 70 | ← | (1) |
| L0K | 220 | 60 | 60 | 60 | 40 | 8 | 20 | 7 | 90 | ← | (1) |
| L0L | 220 | 60 | 60 | 60 | 40 | 8 | 20 | 8 | 90 | ← | (1) |
| L0M | 220 | 60 | 60 | 60 | 40 | 8 | 20 | 7 | 100 | ← | (1) |
| L0N | 220 | 60 | 60 | 60 | 40 | 8 | 20 | 8 | 100 | ← | (1) |
| L0O | 220 | 60 | 60 | 60 | 40 | 8 | 20 | 7 | 110 | ← | (1) |
| L0P | 220 | 60 | 60 | 60 | 40 | 8 | 20 | 8 | 110 | ← | (1) |
| L0Q | 220 | 60 | 60 | 60 | 40 | 9 | 20 | 7 | 70 | ← | (1) |
| L0R | 220 | 60 | 60 | 60 | 40 | 9 | 20 | 8 | 70 | ← | (1) |
| L0S | 220 | 60 | 60 | 60 | 40 | 9 | 20 | 7 | 90 | ← | (1) |
| L0T | 220 | 60 | 60 | 60 | 40 | 9 | 20 | 8 | 90 | ← | (1) |
| L0U | 220 | 60 | 60 | 60 | 40 | 9 | 20 | 7 | 100 | ← | (1) |
| L0V | 220 | 60 | 60 | 60 | 40 | 9 | 20 | 8 | 100 | ← | (1) |
| L0W | 220 | 60 | 60 | 60 | 40 | 9 | 20 | 7 | 110 | ← | (1) |
| L0X | 220 | 60 | 60 | 60 | 40 | 9 | 20 | 8 | 110 | ← | (1) |
| L0Y | 220 | 60 | 60 | 60 | 40 | 8 | 20 | 7 | 70 | ← | (1) |
| L0Z | 220 | 60 | 60 | 60 | 40 | 8 | 20 | 7 | 85 | ← | (1) |
| L0AA | 220 | 60 | 60 | 60 | 40 | 8 | 20 | 7 | 90 | ← | (1) |
| L0BB | 220 | 60 | 60 | 60 | 40 | 8 | 20 | 8 | 70 | ← | (1) |
| L0CC | 220 | 60 | 60 | 60 | 40 | 8 | 20 | 8 | 85 | ← | (1) |
| L0DD | 220 | 60 | 60 | 60 | 40 | 8 | 20 | 8 | 90 | ← | (1) |

FIG.5  Pw=50mW RECORDING

| SAMPLE NO. | L1 LAYER | | | | L1 LAYER | L0 LAYER |
|---|---|---|---|---|---|---|
| | REFLECTANCE (R1) | MODULATION (M1) | REFLECTANCE (R0) | MODULATION (M0) | R1 × M1 | R0 × M0 |
| L0A | 5.9 | 0.62 | 5.5 | 0.57 | 3.6 | 3.1 |
| L0B | 5.6 | 0.62 | 5.0 | 0.57 | 3.5 | 2.8 |
| L0C | 4.0 | 0.62 | 5.2 | 0.57 | 2.5 | 3.0 |
| L0D | 3.7 | 0.62 | 5.2 | 0.57 | 2.3 | 3.0 |
| L0E | 3.2 | 0.62 | 5.4 | 0.57 | 2.0 | 3.1 |
| L0F | 3.1 | 0.62 | 5.4 | 0.57 | 1.9 | 3.1 |
| L0G | 2.5 | 0.62 | 4.6 | 0.57 | 1.6 | 2.6 |
| L0H | 2.5 | 0.62 | 5.1 | 0.57 | 1.5 | 2.9 |
| L0I | 4.9 | 0.62 | 6.6 | 0.57 | 3.0 | 3.7 |
| L0J | 4.6 | 0.62 | 6.9 | 0.57 | 2.8 | 3.9 |
| L0K | 3.3 | 0.62 | 6.8 | 0.57 | 2.0 | 3.9 |
| L0L | 3.0 | 0.62 | 6.9 | 0.57 | 1.9 | 3.9 |
| L0M | 2.6 | 0.62 | 6.3 | 0.57 | 1.6 | 3.6 |
| L0N | 2.5 | 0.62 | 6.9 | 0.57 | 1.6 | 3.9 |
| L0O | 2.2 | 0.62 | 5.8 | 0.57 | 1.4 | 3.3 |
| L0P | 2.0 | 0.62 | 6.2 | 0.57 | 1.3 | 3.5 |
| L0Q | 4.0 | 0.62 | 8.3 | 0.57 | 2.4 | 4.8 |
| L0R | 3.9 | 0.62 | 8.1 | 0.57 | 2.4 | 4.6 |
| L0S | 2.5 | 0.62 | 8.2 | 0.57 | 1.6 | 4.7 |
| L0T | 2.4 | 0.62 | 8.7 | 0.57 | 1.5 | 5.0 |
| L0U | 2.1 | 0.62 | 8.1 | 0.57 | 1.3 | 4.6 |
| L0V | 2.1 | 0.62 | 8.1 | 0.57 | 1.3 | 4.6 |
| L0W | 1.5 | 0.62 | 7.7 | 0.57 | 0.9 | 4.4 |
| L0X | 1.6 | 0.62 | 7.7 | 0.57 | 1.0 | 4.4 |
| L0Y | 4.1 | 0.62 | 10.2 | 0.57 | 2.6 | 5.8 |
| L0Z | 3.2 | 0.62 | 10.3 | 0.57 | 2.0 | 5.9 |
| L0AA | 3.2 | 0.62 | 10.0 | 0.57 | 2.0 | 5.7 |
| L0BB | 4.0 | 0.62 | 10.3 | 0.57 | 2.5 | 5.9 |
| L0CC | 3.4 | 0.62 | 9.4 | 0.57 | 2.1 | 5.4 |
| L0DD | 2.8 | 0.62 | 9.7 | 0.57 | 1.8 | 5.5 |

FIG.6

| SAMPLE NO. | L1 LAYER | | L0 LAYER | | L1 LAYER REPRODUCTION | L0 LAYER REPRODUCTION |
|---|---|---|---|---|---|---|
| | FOCUS | TRACKING (PUSH-PULL) | FOCUS | TRACKING (PUSH-PULL) | | |
| L0A | O | O | O | O | O | O |
| L0B | O | O | O | O | O | O |
| L0C | O | O | O | O | × | O |
| L0D | O | O | O | O | × | O |
| L0E | O | O | O | O | × | O |
| L0F | O | O | O | O | × | O |
| L0G | O | O | O | O | × | × |
| L0H | O | O | O | O | × | O |
| L0I | O | O | O | O | O | O |
| L0J | O | O | O | O | O | O |
| L0K | O | O | O | O | × | O |
| L0L | O | O | O | O | × | O |
| L0M | O | O | O | O | × | O |
| L0N | O | O | O | O | × | O |
| L0O | O | O | O | O | × | O |
| L0P | O | O | O | O | × | O |
| L0Q | O | O | O | O | × | O |
| L0R | O | O | O | O | × | O |
| L0S | O | O | O | O | × | O |
| L0T | O | O | O | O | × | O |
| L0U | O | O | O | O | × | O |
| L0V | O | O | O | O | × | O |
| L0W | × | × | O | O | × | O |
| L0X | × | × | O | O | × | O |
| L0Y | O | O | O | O | × | O |
| L0Z | O | O | O | O | × | O |
| L0AA | O | O | O | O | × | O |
| L0BB | O | O | O | O | × | O |
| L0CC | O | O | O | O | × | O |
| L0DD | O | O | O | O | × | O |

FIG.10

| SAMPLE NO. | L1 LAYER DPD SIGNAL | L0 LAYER DPD SIGNAL |
|---|---|---|
| L0 A | 0.44 | 0.30 |
| L0 B | 0.42 | 0.25 |
| L0 C | 0.30 | 0.26 |
| L0 D | 0.28 | 0.26 |
| L0 E | 0.24 | 0.27 |
| L0 F | 0.23 | 0.27 |
| L0 G | 0.19 | 0.23 |
| L0 H | 0.18 | 0.25 |
| L0 I | 0.36 | 0.33 |
| L0 J | 0.34 | 0.34 |
| L0 K | 0.24 | 0.34 |
| L0 L | 0.23 | 0.34 |
| L0 M | 0.19 | 0.31 |
| L0 N | 0.19 | 0.34 |
| L0 O | 0.16 | 0.29 |
| L0 P | 0.15 | 0.31 |
| L0 Q | 0.30 | 0.42 |
| L0 R | 0.30 | 0.40 |
| L0 S | 0.19 | 0.41 |
| L0 T | 0.18 | 0.44 |
| L0 U | 0.16 | 0.40 |
| L0 V | 0.15 | 0.40 |
| L0 W | 0.11 | 0.39 |
| L0 X | 0.12 | 0.39 |
| L0 Y | 0.31 | 0.51 |
| L0 Z | 0.24 | 0.52 |
| L0 AA | 0.24 | 0.50 |
| L0 BB | 0.30 | 0.52 |
| L0 CC | 0.25 | 0.47 |
| L0 DD | 0.21 | 0.48 |

…
PHASE-CHANGE TYPE OPTICAL RECORDING MEDIUM AND REPRODUCTION METHOD AND APPARATUS FOR SUCH A RECORDING MEDIUM

This application is a 371 of PCT/JP06/310516, filed May 19, 2006.

TECHNICAL FIELD

The present invention generally relates to phase-change type optical recording media and, more particularly, to a phase-change type optical recording medium for high-density recording such as a rewritable digital versatile disc (DVD) having a phase-change type optical recording layer, and a reproduction method and apparatus of the phase-change type optical recording medium.

BACKGROUND ART

Generally, in a compact disc (CD) and a digital versatile disc (DVD), binary signals are recorded and tracking signals are detected by using a change in a reflectance that is generated by interference between lights from a bottom of a recessed pit and a mirror surface portion. In recent years, a phase-change type rewritable compact disc (CD-RW: CD-Rewritable) has become widely used. Additionally, various kinds of phase-change type rewritable DVD have also been suggested. Further, while a capacity of a DVD is 4.7 GB, a system high-density BD has been suggested, which has a capacity of more than 20 GB by reducing a recording and reproduction wavelength to 350 nm to 420 nm and increasing a numerical aperture NA (for example, refer to Non-Patent Document 1). Additionally, in a DVD-R, dual-layer media have been suggested and a recording or reproduction apparatus compliant with the dual-layer media has been achieved.

In the phase-change type rewritable CD, DVD and BD, recording information signals are detected by using a reflectance change and a phase-difference change generated by a difference in refractive index between an amorphous state and a crystal state. A normal phase-change type recording medium has a structure in which a lower protective layer, a phase-change type recording layer, an upper protective layer and a reflection layer are provided on a substrate. The reflectance difference and the refractive index difference are controlled by utilizing multiple interaction of those layers so as to give compatibility with a CD or a DVD. In a CD-RW, a compatibility of recording signals and groove signals with a CD can be acquired within a range of a reflectance reduced to 15% to 25%. Accordingly, reproduction can be made by using a CD drive having an amplification system that covers a low reflectance. It should be noted that in the phase-change type optical recording medium, erasure and rerecording can be performed by intensity modulation of a single convergent light beam. Thus, in a phase-change type optical recording medium such as a CD-RW or a rewritable DVD, recording may include overwriting (O/W) that simultaneously performs recording and erasure in many cases.

As for recording information using a phase change, a crystal, an amorphous or a mixture of those can be used, and also a plurality of crystal phases can be used. In the phase-change type optical recording media materialized at present, it is general that an unrecorded or erasure state is made into a crystal state and recording is made by forming marks of an amorphous state.

As a material of a phase-change type recording layer, a chalcogen element, i.e., a chalcogenide based alloy containing S, Se and Te is used in many cases. For example, they are a GeSbTe system containing a GeTe—$Sb_2Te_3$ pseudo binary alloy as a major component, an InSbTe system containing an InTe—$Sb_2Te_3$ pseudo binary alloy as a major component, an AgInSbTe system containing a $Sb_{0.7}Te_{0.3}$ eutectic alloy as a major component, a GeSbTe system, etc. Among those, a system in which superfluous Sb is added to the GeTe—$Sb_2Te_3$ pseudo binary alloy, especially an intermetallic compound neighborhood composition such as $Ge_1Sb_2Te_4$ or $Ge_2Sb_2Te_5$ is mainly put into practice. Those compositions features crystallization without phase separation that is peculiar to an intermetallic compound, and is easily initialized since a crystal growth rate is large and a recrystallization rate is large during erasure. Thus, conventionally, as a recording layer exhibiting a practical O/W characteristic, a pseudo binary alloy system and an intermetallic compound neighborhood composition attracted attention (for example, refer to Non-Patent Document 2).

Moreover, conventionally, reports are made regarding a recording layer composition, which is a GeSbTe ternary composition or the ternary composition as a matrix containing an additive element (for example, refer to Patent Documents 1-4).

However, a material and a phase composition dealing with the dual-layer media of a DVD-RW is in future development, and there are many problems in applying such a material and phase composition to an optical recording medium for high-density recording such as a rewritable BD.

There is suggested as a heat resistant protective layer material a metal oxide such as ZnO or ZrO, a carbide such as TiC or a mixture of the aforementioned. However, there is no effect of satisfying a recording and reproduction characteristic in sulfide resistance while acquiring storage stability (for example, refer to Patent Document 5).

Moreover, there is suggested a single recording layer with a layer having a triple layer composition of $ZnS.SiO_2/AlN/ZnS.SiO_2$ provided between the recording layer and a substrate (for example, refer to Non-Patent Document 3).

However, a total thickness of the layer cannot be reduced after all.

Moreover, the applicant suggested a phase-change type optical recording medium having a single recording layer structure in which a first recording composition layer, a resin intermediate layer and a second recording layer provided on a substrate in that order (refer to Patent Document 6). The first recording composition layer consists of a heat release layer, a first interface layer, a first protective layer, a first recording layer and a second protective layer in that order from a substrate side. The second recording composition layer consists of a heat release layer, a second interface layer, a fourth protective layer, a second recording layer and a fifth protective layer in that order from the resin intermediate layer side.

Moreover, there is suggested an optical information medium having a first recording stack layer and a second recording stack layer provided in that order on one side of a substrate (for example, refer to Patent Document 7). In this optical information medium, the first recording stack layer consists of a recording layer sandwiched between two dielectric material layers, a transparent metal layer, and a further dielectric layer on a side opposite to a side on which a laser light beam is incident. The second recording stack layer consists of a transparent spacer layer, a phase-change type recording sandwiched between two dielectric material layers, and a metal mirror layer on a side opposite to a side on which the laser light beam is incident. In this case, the first recording stack layer has a thickness of 10 nm to 30 nm, and the metal layer of the first recording stack layer is made of silver. Moreover, the two recording layers are made of recordable material, and both layers are sandwiched by protective layers. Further, the thickness of the metal layer is less than 10 nm and equal to or more than 2 nm.

Patent Document 1: Japanese Laid-Open Patent Application No. 61-258787

Patent Document 2: Japanese Laid-Open Patent Application No. 62-152786

Patent Document 3: Japanese Laid-Open Patent Application No. 64-63195

Patent Document 4: Japanese Laid-Open Patent Application No. 1-211249

Patent Document 5: Japanese Laid-Open Patent Application No. 6-60426

Patent Document 6: Japanese Laid-Open Patent Application No. 2004-185794

Patent Document 7: Japanese Laid-Open Patent Application No. 2002-515623

Non-Patent Document 1: ISOM Technical Digest, '00 (2000), pp. 210

Non-Patent Document 2: SPIE, vol. 2514 (1995), pp. 294-301

Non-Patent Document 3: ODS2001, Technical Digest pp. 28

However, although the above-mentioned phase-change type optical recording media are easily recordable with a short wavelength such as a blue laser since the material absorbs a large amount of light of a short wavelength, it is difficult to record the media with a red wavelength since the material absorbs only a small amount of light of the red wavelength. Thus, in a medium having a single recording layer, a thick reflection layer is provided so as to prevent a light from transmitting therethrough so that the media is easily recordable.

However, in a case where two recording layers are provided, multi-layer recording cannot be performed unless the first recording layer on the side where a light is incident transmits about a half amount of the light. Thus, if the first recording layer is made to transmit the light therethrough, the first layer cannot absorb a sufficient amount of light and it is difficult to achieve recording. Since a red wavelength LD is capable of emitting a light with a high power, one time recording can be performed by applying a high power to the medium. However, it is difficult to maintain an overwrite (O/W) characteristic since the film tends to be deteriorated by the high power being applied. Additionally, if a recording sensitivity is raised so as to be easily overwritten, there is a problem that reliability with respect to temperature and humidity is deteriorated.

In the meantime, DVDs currently on the market are classified into a DVD (containing a dual-layer structure) that is exclusive for reproduction, a DVD±R (containing a dual-layer structure) that is recordable, and a DVD±RW (only a single layer structure) containing dual-layer structure) that is rewritable. Any of those DVDs can be reproduced by a DVD video recorder or a DVD player. However, presently, the rewritable DVD±RW is materialized with only a single layer structure, and recording time is about a half of that of a dual-layer structure, which raises a problem in that long time recording cannot be made. Thus, it is desirous to develop a DVD±RW, which is rewritable and permits long time recording.

However, a reflectance of a dual-layer structure DVD±RW is only about one-third of that of a recordable dual-layer structure DVD±R. Accordingly, the dual-layer structure DVD±RW cannot be reproduced by a present DVD video recorder or a DVD player. Thus, it is necessary to devise in an information reproducing method including a composition of a DVD.

In an optical disc apparatus technique, a focus error signal (FE) and a track error signal (TE) are normalized so as to perform a focus servo and a track servo, and a technique for normalization is suggested (for example, refer to Patent Document 8). Specifically, Patent Document 8 discloses that a summation signal from a divided light-receiving element (hereinafter, referred to as PU) of an optical pickup device is used as an original signal for normalizing a servo signal such as a focus signal, a track signal, etc.

FIG. 1 shows an automatic gain control (AGC) circuit used in a conventional optical disc apparatus. In the AGC circuit, a plurality of signals VA, VB, VC and VD from a PU are operated by a focus error (FE) arithmetic circuit 101 to calculate FE=(A+C)−(B+D) and a track error (TE) arithmetic circuit 102 to calculate TE=(B+C)−(A+D). Additionally, SUM=(A+B+C+D) is calculated by a SUM arithmetic circuit 103. A normalization circuit comprises an AGCCNT circuit 104 and voltage control amplifiers (VCAs) 105. A gain of each VCA 105 is set by the AGCCNT circuit 104 so that a level of a SUM signal from the SUM arithmetic circuit 103 input to the AGCCNT circuit 104 is a constant voltage. Specifically, for example, if it is set so that the level of the SUM signal is 1 V, the gain of each VCA 105 becomes equal to 1 (GAIN=1/SUM).

At this time, an AGC operation of the FE signal and the TE signal is carried out as follows.

$$FEn=[(A+C)-(B+D)]/(A+B+C+D)$$

$$TEn=[(B+C)-(A+D)]/(A+B+C+D)$$

It is quite difficult to enlarge an AGC gain range in each VCA 105, and about ±10 dB is appropriate. Since the AGC amplifier is used for a servo signal, an input offset cannot be fluctuated with respect to a gain fluctuation. That is, an extremely small fluctuation is required for a large gain range.

Patent Document 8: Japanese Laid-Open Patent Application No. 2001-101680

Therefore, in the conventional optical disc apparatus shown in FIG. 1, in order to take a large range of the gain and to also reduce a fluctuation of an offset, a circuit scale must be enlarged and there is a problem that realization is difficult. Moreover, although an input offset and an AGC gain error are small at the center of the AGC range, the input offset and the AGC gain error become large at the end of the AGC range.

DISCLOSURE OF THE INVENTION

It is a general object of the present invention to provide an improved and useful phase-change type optical recording medium and reproduction method and apparatus of such a recording medium in which the above-mentioned problems are eliminated.

A more specific object of the present invention is to provide a phase-change type optical recording medium having a dual-layer structure, which causes recording and reproduction to be performed easier.

Another object of the present invention is to provide a reproduction method and apparatus which enables information reproduction of a dual-layer structure DVD±RW having a reflectance which is one-third of that of a recordable dual-layer structure DVD±R.

In order to achieve the above-mentioned objects, there is provided according to one aspect of the present invention a phase-change type optical recording medium having two recording layers formed therein, wherein a product of a reflectance of a high-reflection part and a modulation after recording is set to a value equal to or higher than a lower limit value for reproduction.

In the phase-change type optical recording medium according to the present invention, the product may be set to be equal to or higher than 2.8. A recording groove of each of the recording layer may be spirally or concentrically formed, and a reflectance of the phase-change type optical recording medium may be 4% to 10%. A modulation after recording may be 0.4 to 0.65. A tracking is performed when a phase-difference signal may be equal to or greater than 0.3. A depth of groove of a substrate may be 200 Å to 300 Å, a track pitch may be 0.64 µm to 0.8 µm, and a width of the groove may be 0.18 µm to 0.3 µm at a half-value width.

Additionally, there is provided according to another aspect of the present invention a reproduction method of a multilayer phase-change type optical recording medium having at least a first recording structure layer, a resin intermediate layer, a second recording structure layer and a cover substrate sequentially formed on a substrate, comprising: setting a first power of a reproduction light beam for a rewritable multilayer phase-change type optical recording medium higher than a second power of the reproduction light beam for a reproduction only multilayer phase-change type optical recording medium; and reproducing information recorded on the first and second recording structure layers of the reproduction light beam for a rewritable multilayer phase-change type optical recording medium using the first power.

In the reproduction method according to the present invention, the first power may be set to a value within a range from 1.0 mW to 1.8 mW. Pull-in of a focus may be performed in a direction of movement of an objective lens of an optical pickup device from the first recording structure layer to the second recording structure layer. A start position of a focusing operation of an objective lens of an optical pickup device may be set so that a focal point of a light beam outgoing from the objective lens is beyond a first recording layer of said first recording structure layer.

Further, there is provided according to another aspect of the present invention a reproduction apparatus of a multilayer phase-change type optical recording medium having at least a first recording structure layer, a resin intermediate layer, a second recording structure layer and a cover substrate sequentially formed on a substrate, comprising: a controller setting a first power of a reproduction light beam for a rewritable multilayer phase-change type optical recording medium higher than a second power of the reproduction light beam for a reproduction only multilayer phase-change type optical recording medium; and an optical pickup device irradiating said reproduction light beam having the first power onto the rewritable multilayer phase-change type optical recording medium so as to reproduce information recorded on the first and second recording structure layers.

In the reproduction apparatus according to the present invention, the first power may be set to a value within a range from 1.0 mW to 1.8 mW. The optical pickup device may perform pull-in of a focus in a direction of an objective lens provided therein moving from the first recording structure layer to the second recording structure layer. The controller may set a start position of a focusing operation of an objective lens of said optical pickup device so that a focal point of a light beam outgoing from the objective lens is beyond a first recording layer of the first recording structure layer.

Additionally, there is provided according to another aspect of the present invention a processor readable recording medium storing a program causing a computer to perform the above-mentioned reproduction method and a computer readable reproduction program causing a computer to perform the above-mentioned reproduction method.

Other objects, features and advantages of the present invention will become more apparent from the following detailed description when read in conjunction with the accompanying drawings.

BRIEF DESCRIPTION OF THE DRAWINGS

FIG. 4 is an illustration showing film deposition conditions of sample discs;

FIG. 5 is an illustration showing a reflectance, a modulation and a value of a product (R×M) of those of a disc produced according to a film deposition condition shown in FIG. 4;

FIG. 6 is an illustration showing a result of evaluations as to whether or not focusing, tracking (push-pull) and reproduction of a disc produced according to a film deposition condition shown in FIG. 4 can be made;

FIG. 10 is an illustration showing values of a DPD signal when a tracking is performed;

BEST MODE FOR CARRYING OUT THE INVENTION

A description will now be given of embodiments of the present invention.

Figure 1:
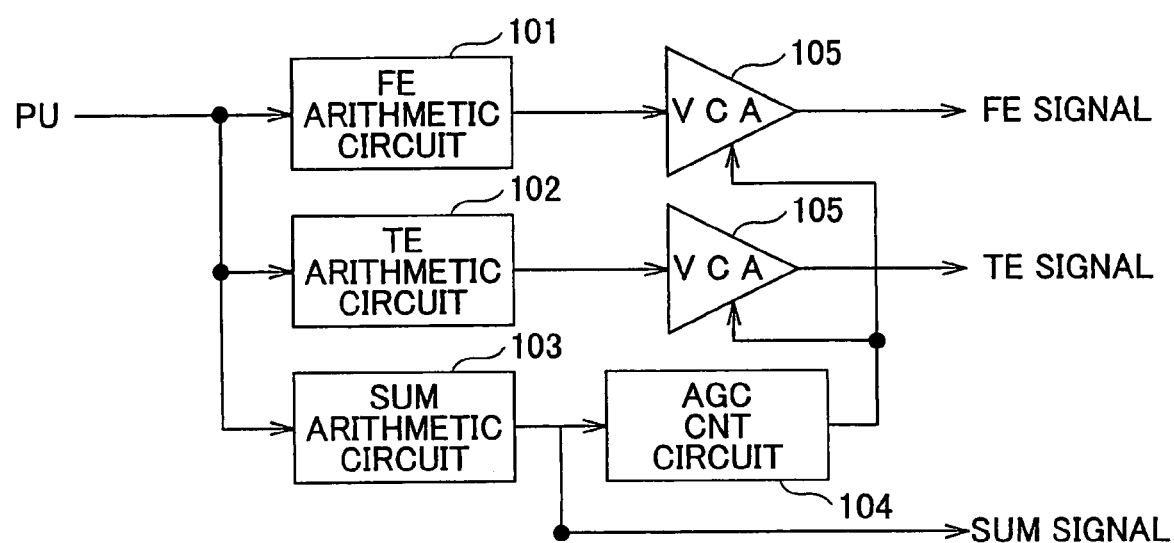
FIG. 1 is a block diagram of an automatic gain control (AGC) circuit used in a conventional optical disc apparatus.
Figure 2:
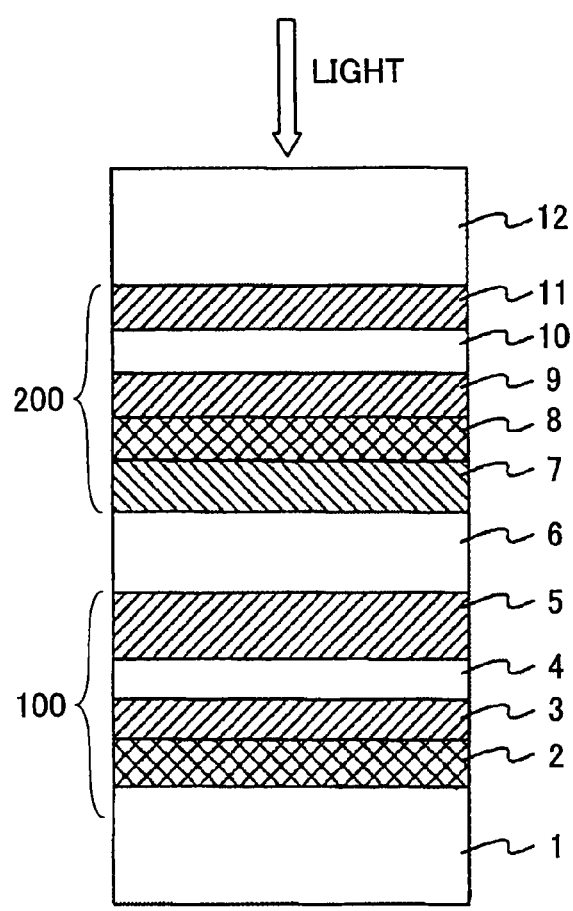
FIG. 2 is an illustration of a cross section of a layer structure of a phase-change type optical recording medium according to a first embodiment of the present invention.

FIG. 2 is an illustration of a cross section of a layer structure of a phase-change type optical recording medium according to a first embodiment of the present invention.

As shown in FIG. 2, the phase-change type optical recording medium according to the present embodiment comprises a substrate 1, a reflective layer 2, a first protective layer 3, a first recording layer 4, a second protective layer 5, a resin intermediate layer 6, a third protective layer 7, a heat release layer 8 made of a Cu or Cu alloy layer, a fourth protective layer 9, a second recording layer 10, a fifth protective layer 11, and a cover substrate 12.

As the material of the substrate 1, a transparent resin such as polycarbonate, acrylic resin or polyolefin or a transparent glass may be used. Among those materials, the polycarbonate resin is most widely used for forming a compact disc (CD) especially, and is a most preferable material since it is inexpensive. In a case of a DVD, a groove of a pitch of 0.74 μm is provided normally in the substrate. Such a groove is not always required to have a cross section in geometrically square shape or trapezoidal shape. For example, such a groove may be formed optically by forming a wave-guide path having different refraction indexes by, for example, ion injection.

As a desirable phase-change type recording material used for the first and second recording layers 4 and 10, there are alloys containing Sb and Te as major components. Among those, an alloy containing Ge, Sb and Te as constituent elements is preferable. Each recording layer containing those constituent elements may be added with other elements, if necessary, by total of 10 atomic %. Moreover, the optical constant of the recording layer can be finely adjusted by adding at least one element selected from a group consisting of O, N and S by 0.1 to 5 atomic %. However, if the additive exceeds 5 atomic %, a crystallization rate is decreased, which is not preferable since it deteriorates an erasure performance.

Moreover, in order to improve a stability over time without decreasing the crystallization rate during overwrite (O/W), at least one element selected from a group consisting of V, Nb, Ta, Cr, Co, Pt and Zr is preferably added by 8 atomic % or less, and more preferably, by 0.1 to 5 atomic %. It is preferable that a total amount of additives of those elements and Ge is equal to or less than 15 atomic % with respect to SbTe. If it exceeds 15 atomic %, it may induce a phase separation of components other than Sb. Especially, the effect of additives is large when Ge content is 3 to 5 atomic %.

Moreover, in order to improve the stability over time and finely adjust a refractive index, it is preferable to add at least one element selected from a group consisting of Si, Sn and Pb by equal to or less than 5 atomic %. It is preferable that the total amount of additives of those elements and Ge is equal to or less tan 15 atomic %. It should be noted that Si, Sn, and Pb are the elements which have a four-configuration network as well as Ge.

Moreover, a crystallization temperature can be increased while reducing jitter and improving recording sensitivity by adding at least one element selected from a group consisting of Al, Ga and In by equal to or less than 8 atomic %, and preferably 6 atomic % since segregation tends to occur. It is preferable that a total amount of those elements and Ge is equal to or less than 15 atomic %, and more preferably, equal to or less than 13 atomic %.

Moreover, if Ag is added by an amount equal to or less than 8 atomic %, there is an effect of improving recording sensitivity, and the effect is remarkable if an amount of added Ge exceeds 5 atomic %. However, if the amount of Ag exceeds 8 atomic %, it is not preferable since jitter may be increased or stability of amorphous mark is deteriorated. Additionally, if a total amount of Ag and Ge exceeds 15 atomic %, it is not preferable since segregation tends to occur. An especially preferable amount of Ag added is 5 atomic %.

The first and second recording layers 4 and 10 are phase-change type recording layers, and, generally a thickness thereof is preferably in a range of 5 to 100 nm. If the thickness is smaller than 5 nm, it is difficult to acquire a sufficient contrast and a crystallization rate tends to decrease, which makes it difficult to perform erasure within a short time. On the other hand, if the thickness exceeds 100 nm, it is also difficult to acquire optical contrast and a crack tends to occur. It is required for a contrast to be compatible with a reproduction only disc such as a DVD.

Moreover, in high-density recording in which a shortest mark length is equal to or smaller than 0.5 μm, it is preferable that the thickness of the first and second recording layers is 5 to 25 nm. If the thickness is smaller than 5 nm, it is not preferable since a reflectance is too low, and ununiform composition in initial film growth and influences of a nondense film tend to appear. On the other hand, if the thickness is larger than 25 nm, a heat capacity is large and recording sensitivity is deteriorated, and an edge of an amorphous mark is disturbed and jitter tends to increase due to three-dimensional crystal growth. Further, a volume change due to phase change of the first and second recording layers is remarkable, which is not preferable since repeated overwrite (O/W) resistance is deteriorated. In a viewpoint of jitter of a mark edge and repeated overwrite resistance, the thickness is preferably equal to or smaller than 20 nm.

The density of the first and second recording layers 4 and 10 is equal to or greater than 80% of a bulk density, and preferably be equal to or greater than 90%. In order to increase the density in a sputtering film deposition method, it is required to increase an amount of high-energy Ar irradiated onto the recording layer by decreasing a pressure of a sputter gas (rare gas such as Ar) during film deposition or placing a substrate close to a front of a target.

The high-energy Ar is one of Ar ions irradiated onto a target for sputtering and bouncing and reaching the substrate side and Ar ions in plasma being accelerated by a sheath voltage at an entire surface of a substrate and reaching the substrate. Such an irradiation effect of a high-energy rare gas is referred to as atomic peening effect. In a sputter in Ar gas which is used generally, Ar gas is mixed into a sputter film due to the atomic peening effect. The atomic peenig effect can be estimated according to an amount of Ar mixed into the film. That is, if the amount of Ar is small, it means that the high-energy Ar irradiation effect is small and a nondense film tends to be formed. On the other hand, if the amount of Ar is too much, irradiation of high-energy Ar is strong, which causes generation of voids due to release of Ar, which is taken into the film, during repeated overwrite (O/W) and causes the repeat resistance to be deteriorated. An appropriate amount of Ar in the recording layer film is 0.1 to 1.5 atomic %. Further, it is preferable to use high-frequency sputtering rather than direct current sputtering since it reduces an amount of Ar in the film and a high-density film is obtained.

Additionally, the first and second recording layers 4 and 10 after film deposition is normally in an amorphous state. Accordingly, it is needed to crystallize each entire recording layer after the film deposition to be in an initialized state (unrecorded state). As for the initialization method, initialization by annealing in a solid phase may be taken, but it is preferable to initialize by so-called melt-recrystallization which melts a recording layer and gradually cools to solidify the recording layer to be crystallized. The above-mentioned each recording layer has little crystal nucleus immediately after film deposition and it is difficult to crystallize in a solid phase. However, according to the melt-recrystallization, by melting after small number of crystal nucleus is formed, recrystallization progresses rapidly with crystal growth as a main.

Since the reflectance is different between the crystal according to the melt-recrystallization and crystal according to annealing in a solid phase, mixture of them may cause noise. In practical O/W recording, an erased portion becomes crystal due to melt-recrystallization, and, thus, it is preferable to also perform initialization according to melt-recrystallization.

When performing initialization according to melt-recrystallization, it is recommended to melt a recording layer locally and within a short time such as 1 msec or less. This is for the reason that if a melted area is large or a melting time or a cooling time is too long, each layer may be destroyed or a plastic substrate surface may be deformed due to heat. In order to give heat history appropriate for initialization, it is preferable to irradiate a high-output semiconductor laser light with a wavelength of about 600 to 1000 nm by converging the light in an ellipse form having a longer axis of 100 to 300 µm and a shorter axis of 1 to 3 µm and scans the light at a linear velocity of 1 to 10 m/sec along the direction of the shorter axis as a scanning axis. With the same converged light, a melted area is too large and recrystallization tends to occur if it is close to a circular form, and, thus, it is not preferable since there may be a large damage given to a multi-layer structure or a substrate.

The fact that the initialization was performed according to melt-rerystallization can be checked as follows. Namely, a recording light having a recording power Pw, which is converged into a spot diameter smaller than about 1.5 µm and is sufficient for melting a recording layer, onto a medium after initialization linearly at a constant velocity. If there exists a guiding groove, it is performed while tracking servo or a focus servo is applied to a track formed by the groove or a portion between the grooves.

Thereafter, if the reflectance of the erasure state acquired on the same track by irradiating an erasure light of an erasure power Pe ($\leq$Pw) in direct current is completely the same as the reflectance in the unrecorded initialized state, it can be confirmed that the initialized state is the melt-recrystallized state. This is because the recording layer was once melted by the recording light irradiation and the state where the thus-melted recording layer is completely recrystallized by the erasure light irradiation is the result of melting by the recording light and recrystallization by the erasure light, which is the state of melt-recrystallization. The fact that a reflectance Rini in the initialized state and a reflectance Rcry in the melt-recrystallized state are the same means that a difference between the reflectance Rini and Rcry defined by (Rini–Rcry)/{(Rini+Rcry)/2} is equal to or less than 0.2 (that is, 20% or less). Normally, the difference in reflectance is greater than 20% when only solid crystallization such as annealing is performed.

As shown in FIG. 2, the first recording layer 4 is provided between the first protective layer 3 and the second protective layer 5, and the second recording layer 10 is provided between the fourth protective layer 9 and the fifth protective layer 11. A description will be given below of the first, second fourth and fifth protective layers that sandwich the recording layers.

The first protective layer 3 and the fourth recording layer 9 have a function to efficiently release heat to the reflective layer or the Cu or Cu alloy layer. On the other hand, the second protective layer 5 is mainly effective for preventing deformation of a surface of the resin intermediate layer due to a high temperature during recording. The fifth protective layer 11 is effective for adjusting a reflectance and preventing deformation of the cover substrate The material of the first, second, fourth and fifth protective layers 3, 5, 9 and 11 is determined in consideration of a refractive index, a thermal conductivity, a chemical stability, a mechanical strength, an adhesion nature, etc. It is better that the material has a low thermal conductivity, which level is $1\times10^{-3}$ pJ/(µm·N·nsec). It should be noted that it is difficult to directly measure the thermal conductivity of such a low thermal conductivity material in a thin film state. Instead of direct measurement, a rough value can be obtained by a thermal simulation and a result of measurement of an actual recording sensitivity.

As the above-mentioned low thermal conductivity material, which brings a preferable result, for the second protective layer 5 and the fifth protective layer 11, there is a composite dielectric material containing at least one selected from a group consisting of ZnS, ZnO, $TaS_2$ and a rare earth sulfide by 50 to 90 moll % and also containing a heat-resistant compound having a high-transparency and a melting point or a decomposition point equal to or higher than 1000°C. As a specific example of a rare earth sulfide, there is a composite dielectric material containing a rare earth sulfide such as La, Ce, Nd, Y, etc., by 60 to 90 moll %. Further, it is preferable that the rate of ZnS, ZnO, $TaS_2$ or a rare earth sulfide is 70 to 90 moll %.

As a heat-resistant compound having a melting point or a decomposition point of 1000° C. or higher, there are an oxide, nitride or carbide of Mg, Ca, Sr, Y, La, Ce, Ho, Er, Yb, Ti, Zr, Hf, V, Nb, Ta, Zn, Al, Si, Ge, Pb, etc., and a fluoride of Ca, Mg, Li, etc. It should be noted that the oxide, sulfide, nitride carbide and fluoride are not needed to take a stoichiometric composition, and it is effective to change a composition or mix them for controlling a refractive index.

As a material of the first and fourth protective layers 3 and 9, a material having a thermal conductivity higher than that of the SnOx based second and fifth protective layers 5 and 11 may give a good recording characteristic. It is preferable that the first and fourth protective layers 3 and 9 do not contain S. Additionally, good reliability can be obtained if the layers contain TaOx or the like by 10 moll % to 30 moll %.

A description will now be given of a function of each of the above-mentioned protective layers.

The layer structure according to the present invention is a kind of layer structure which is referred to as a rapid cooling structure. The rapid cooling structure achieves a high erasure ratio by high-rate crystallization while eliminating a problem of recrystallization when forming an amorphous mark by using a layer structure which promotes heat radiation and increases a cooling rate when a recording layer is resolidified.

The film thickness of the fist and fourth protective layers 3 and 9 give a great influence to permanence in repeat overwrite (O/W), and it is important in suppressing deterioration of jitter. The film thickness is generally 5 to 30 nm. If the film thickness is smaller than 5 nm, it is not preferable since a delay effect of heat conductance at the protective layers 3 and 9 is not sufficient and recording sensitivity is decreased remarkably. If the film thickness is larger than 30 nm, a sufficient flattening effect of a temperature distribution in a direction of a mark width is not obtained. Besides, a temperature difference between a recording layer side and a reflective layer or a heat release layer side of each of the second and fifth protective layers 5 and 11 tends to be deformable due to a difference in thermal expansion on both sides of the protective layer. The repetition causes accumulation of microscopic deformation in the protective layer and invites an increase in noise, which is not preferable.

The film thickness of the first and fourth protective layers 3 and 9 is preferably 15 to 25 nm when the wavelength of the recording laser light is 600 to 700 nm and 3 to 20 nm when the wavelength is 350 to 600 nm, and more preferably 3 to 15 nm.

Moreover, the film thickness of the second and fifth protective layers 5 and 11 must be 30 to 250 nm. If the film thickness is smaller than 30 nm, the layers can be easily destroyed by deformation when the recording layer is melted, which deteriorates the O/W characteristic.

The present inventors considered and studied an appropriate layer structure of a phase-change type optical recording medium having a dual-layer recording structure to confirm to the above-mentioned requirements, and made a design to match recording sensitivities of the two layers by using Cu or a Cu alloy having a high transparency and a good heat radiation in the thickness of equal to or greater than 2 nm and smaller than 10 nm so that an optical transparency and heat radiation and a high recording sensitivity are obtained.

In the high-density mark length modulation recording using the above-mentioned optical system, it is important to use a material having a low thermal conductivity for the first and fourth protective layers 3 and 9, and the film thickness thereof is preferably 3 to 20 nm.

Additionally, since the light reaching the first recording structure layer 100 is a transparent light which has transmitted through the second recording structure layer 200, an amount of incident light is less than a half of that of the second recording structure layer 200. Accordingly, it is preferable that the amount of incident light on the second recording structure layer 200 is increased or the sensitivity of the first recording layer 4 of the first recording structure layer 100 is raised.

In the present invention, in the first recording structure layer 100 having smaller amount of incident light, the first recording layer 4 is sandwiched between layers having a low thermal conductivity so as to raise recording sensitivity, and the film thickness of the first protective layer 3 is reduced to 3 to 20 nm so as to easily absorb heat, and, thereby, the recording sensitivity can be raised.

In the above-mentioned layer structure, when only the thermal conductivity is considered, the heat radiation effect can be promoted even if the thermal conductivity coefficient of the first protective layer 3 or the fourth protective layer 9 is raised. However, if the heat radiation is promoted excessively, an irradiation power needed for recording is raised, which causes a problem that the recording sensitivity is remarkably decreased. Thus, it is necessary to maintain the thermal conductivity low.

By using a thin film protective layer of a low thermal conductivity, a time delay is given to the thermal conductance from the recording layer to the reflective layer or the heat release layer for several nanoseconds to several tens nanoseconds at a recording power irradiation start time, and, thereafter, the heat radiation to the reflective layer or the heat release layer can be promoted. Thus, there is no unnecessary decrease in the recording sensitivity by the thermal conductance of the protective layers.

For the above-mentioned reason, the known protective layer material containing $SiO_2$, $Ta_2O_5$, $Al_2O_3$, AlN, SiN, etc., as a major component is not preferably used since the material itself has an excessively high thermal conductivity.

Next, a description will be given of the third protective layer 7.

As for a preferable material of the third protective layer 7, there are ITO (a mixture composition of $In_2O_3$ and $SnO$), IZO (a mixture composition of $In_2O_3$ and $ZnO$), etc., which can raise a light transmittance at wavelength from 380 nm to 420 nm. Since those materials have a high thermal conductivity, heat generated when recording is made in the second recording layer 10 is radiated through the heat release layer 8. Thereby, the recording layer, which is made of a phase-change material containing SbTe as a major component requiring rapid cooling, is put in an appropriate rapid cooling state, and, thus, it becomes possible to form a small amorphous mark.

The third protective layer 7 is preferably as thick as possible when considering the heat radiation effect. However, if the thickness exceeds 200 nm, a stress becomes large and cracking may occur. On the other hand, if the thickness is smaller than 20 nm, the heat radiation effect is not sufficient. Thus, the thickness is preferably 20 nm to 200 nm, and more preferably 30 nm to 160 nm.

A description will now be given of the reflective layer 2 and the heat release layer 8 that provide the heat radiation function.

By using a high thermal conductivity material as the reflective layer 2, an erasure ratio and an erasure power margin can be improved. As a result of consideration, in order to exhibit a good erasure characteristic of the recording layer according to the present invention in a large erasure power range, it is preferable to use a layer structure that can flatten not only a temperature distribution in a direction of the film thickness and a change with time passage but also a temperature distribution in a film plane direction (direction perpendicular to a recording beam scanning direction). In the present invention, it is preferable to promote a heat radiation effect in a transverse direction by using a thin reflective layer having an extremely high thermal conductivity and a thickness equal to or smaller than 300 nm.

Moreover, if the film thickness is equal to or larger than 12 nm, the transmittance is sharply decreased, and if the film thickness if less than 2 nm, a modulation after recording cannot be performed, and, thus, the film thickness is preferably 2 nm to 12 nm, and more preferably 6 nm to 10 nm when considering a dual-layer recording and reproduction characteristic (transmittance of a light incident side and recording and reproduction characteristic).

The modulation is a value given by an equation "(high-reflection part—low-reflection part)/high-reflection part)" where the low reflection part is an amorphous portion formed after recording and the high reflection part is a portion erased and crystallized when recording.

Moreover, a thermal conductivity of a thin film is generally smaller than that of a bulk state. Especially, in a thin film having a thickness smaller than 40 nm, there may be a case where the thermal conductivity is reduced more than one order due to influences of an island structure at an initial stage of growth, which is not preferable. Further, since crystallinity and an amount of impurity vary depending on a film deposition condition, there may be a case where a thermal conductivity differs even if an attempt is made to form a film having the same composition, and, thereby a consideration should be given.

Although the heat radiation by the reflective layer 2 of the first recording structure layer 100 can be promoted even when the thickness of the reflective layer 2 is increased, if the thickness exceeds 300 nm, the thermal conductance in a direction of the film thickness is much more remarkable than the thermal conductance in a plane direction of the first recoding layer 4, and, thus, a temperature distribution improving effect in the plane direction of the film cannot be obtained. Additionally, the heat capacity of the reflective layer 2 itself is increased, and cooling of not only the reflective layer 2 but also the first recording layer 4 takes a long time, which prevents formation of an amorphous mark. Most preferably, the reflective layer 2 having a high thermal conductivity is made thin so as to selectively promote the heat radiation in a transverse direction. In a conventionally used rapid cooling structure, an attempt is made to rapidly release heat from the first recording layer 4 to the reflective layer 2 in consideration of only one-dimensional heat release in the plane direction of the film, and, thus, there is insufficient attention paid to flattening the temperature distribution in the plane direction.

As a material of the reflective layer 2, there are Ag or an Ag alloy, an Al alloy, etc. As an Ag alloy, the same Ag alloy as that used for the heat release layer 8 mentioned later may be used. When using an Ag alloy for the reflective layer 2, a film thickness of 30 to 200 nm is preferable. If the film thickness is smaller than 30 nm, the heat radiation effect is insufficient even if a pure Ag is used. If the film thickness exceeds 200 nm, heat is released in a perpendicular direction rather than a horizontal direction, and there is no contribution to improvement of the heat distribution in the horizontal direction. An unnecessarily large thickness may deteriorate productivity and also deteriorate microscopic flatness of the film surface.

As for an Al ally, there is an alloy containing at least one of Ta, Ti, Co, Cr, Si, Sc, Hf, Pd, Pt, Mg, Zr, Mo and Mn by 0.2 to 2 atomic %. In such an alloy, a volume resistivity is increased in proportion to a concentration of the additive element, and also a hillock resistance is improved, and, thus, the alloy can be used in consideration of a permanence, a volume resistivity, a film deposition rate, etc. If an amount of additive impurity is less than 0.2 atomic %, there are many cases where a hillock resistance is insufficient, although it depends on a film deposition condition. On the other hand, if the amount of additive impurity is larger than 2 atomic %, it is difficult to obtain the above-mentioned low resistivity. When putting an importance to a stability over time, Ta is preferable as the additive component.

Further, an Al—Cu based alloy containing Cu by 0.3 to 5.0 atomic % is preferable. Especially, when using a dual-layer structure protective layer in which a film having a mixture composition of ZnS and $SiO_2$ and a film of $Ta_2O_5$, an Al—Cu based alloy containing Cu by 0.5 to 4.0 atomic % is preferably used since it satisfies a corrosion resistance, an adhesion nature and a high thermal conductivity in a balanced manner. Additionally, an Al—Mg—Si based alloy containing Si by 0.3 to 0.8 atomic % and Mg by 0.3 to 1.2 atomic % is preferable.

When using the above-mentioned Al alloy as a reflective layer, a preferable film thickness is 150 to 300 nm. If the film thickness is smaller than 150 nm, even pure Al has insufficient heat radiation effect. On the other hand, if the film thickness exceeds 300 nm, heat is released in a perpendicular direction rather than a horizontal direction, as is the same as the Ag alloy, which does not contributes to an improvement of heat distribution in the horizontal direction, and a heat capacity of the reflective layer 2 itself becomes large, thereby decreasing a cooling rate of the recording layer. Additionally, a microscopic flatness of the film surface is deteriorated.

The present inventor found that the volume resistivity of the Al alloy or Ag alloy used for the reflective layer 2 increases in proportion to an additive element concentration. On the other hand, it is generally considered that addition of impurities generally decreases a crystal grain diameter and increases electron scattering at grain boundaries, which cause a decrease in a thermal conductivity. Adjusting an amount of additive impurities is necessary for increasing the crystal grain diameter to acquire a high thermal conductivity which the material originally has.

A description will now be given of the heat release layer 8 formed of Cu or a Cu alloy.

In the second record layer 10 of the present invention, a crystal growth near the crystallization temperature (Tm) when being resolidified is a bottleneck of recrystallization. In order to assure formation of an amorphous mark and an edge of the amorphous mark by increasing a cooling rate to the maximum near Tm, an ultra rapid cooling structure is effective. Additionally, flattening of a temperature distribution in a direction of a film surface assures an erasure by recrystallization so that an original rapid erasure near Tm can be maintained with a higher erasure power. Thus, if the ultra rapid cooling structure, which considers a thermal conductivity delay effect near Tm, is applied to the second recording structure layer 200 according to the present invention, a further effect can be obtained than the conventional GeTe—$Sb_2Te_3$ recording layer.

In the present invention, the heat release layer 8 is provided to achieve such an ultra rapid cooling. When forming the heat release layer 8, it is necessary to eliminate unevenness in the film thickness by decreasing a deposition rate for film deposition to be smaller than that of the reflective layer 2. The film thickness is preferably equal to or greater than 2 nm and smaller than 10 nm. If the film thickness is smaller than 2 nm, unevenness occurs even when the deposition rate is made small. If the film thickness is not smaller than 10 nm, since the transparency of the second recording structure layer 200 cannot be raised, a light does not reach the first recording layer 4. Thus, the transmittance of the second recording structure layer 200 is preferably equal to or greater than 45%.

Figure 3:
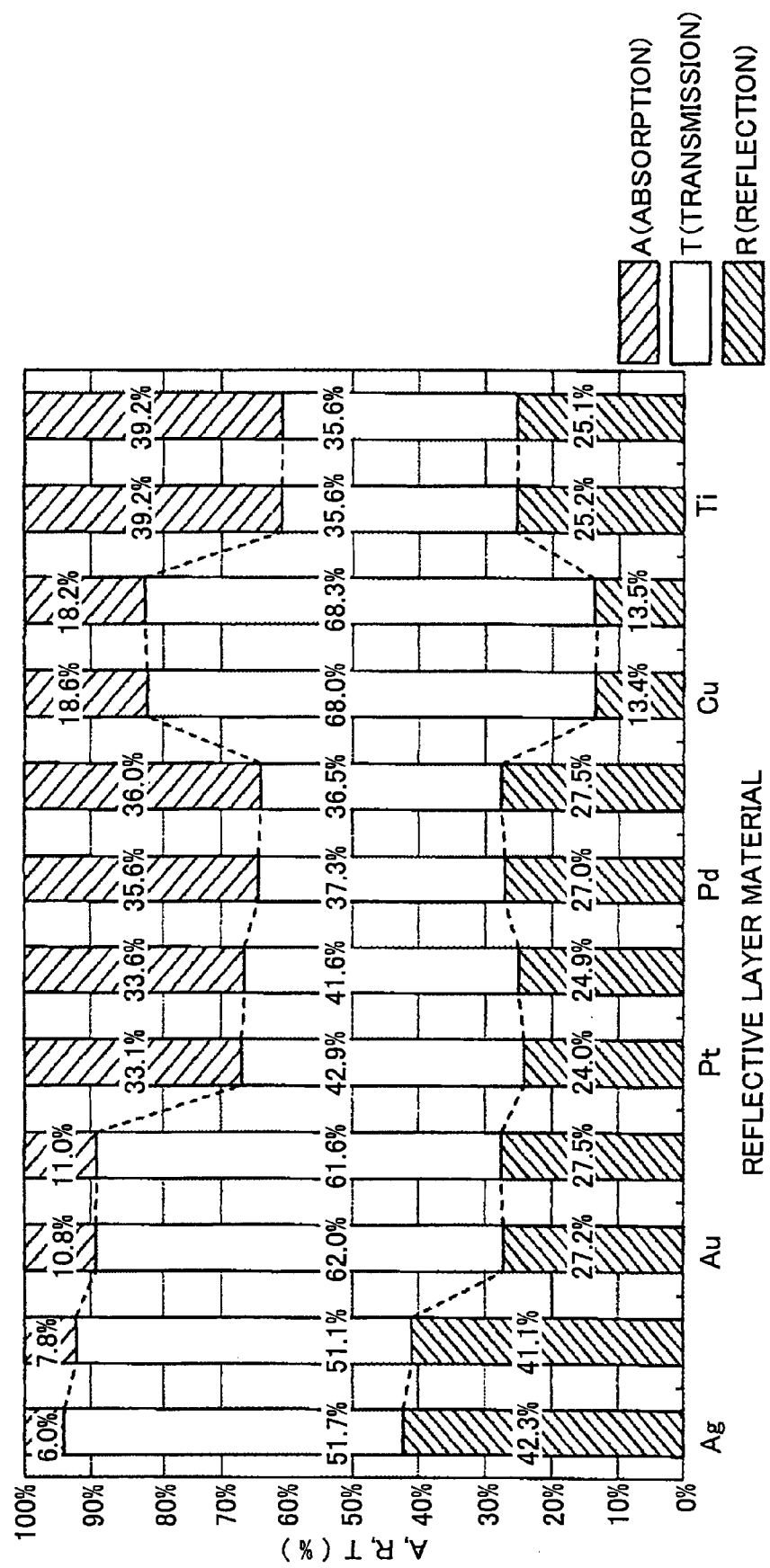
FIG. 3 is a graph showing characteristics of absorption, transmission and reflection of various metals used for a reflective layer and a heat release layer.

FIG. 3 is a graph showing characteristics of absorption A, transmission T and reflection R of various metals used for a reflective layer and a heat release layer. It should be noted that the film thickness of each metal is 1 nm.

It can be appreciated from FIG. 3, Cu or a Cu alloy has a higher transmittance T than a metal such as Ag, Pt, Au, etc. That is, Cu or a Cu alloy is appropriate for the heat release layer 8 which is arranged on the light incident side. It should be noted that by adding Mo to Cu by several %, a good characteristic can be obtained in that there is little jitter even in a 80 degrees-85% reliability test.

Although the reflective layer 2 and the heat release layer 8 are usually formed by a sputter method or a vacuum vapor-deposition method, a total amount of impurities including a water component and oxygen mixed during film deposition as well as impurities contained in a target and a vapor deposition material itself must be reduced to be equal to or less than 2 atomic %. Accordingly, an ultimate vacuum in a process chamber is preferably $1 \times 10^{-3}$ Pa. Additionally, when performing film deposition at an ultimate vacuum lower than $10^{-4}$ Pa, it is preferable to prevent impurities from being taken in by setting a film deposition rate to be equal to or higher than 1 nm/sec, and preferably, equal to or higher than 10 nm/sec. Or, if additive elements are contained intentionally by an amount more than 1 atomic %, the film deposition rate is preferably increased to be equal to or higher than 10 nm/sec so as to prevent additional impurities from being mixed.

There is a case where a film deposition condition gives influences to a crystal grain diameter irrespective of an amount of impurities. For example, in an alloy film containing Al with Ta added by about 2 atomic %, an amorphous phase is mixed between crystal grains, but a ratio of the amorphous phase to a crystal phase depends on a film deposition condition. Additionally, a ratio of the crystal part increases, a volume resistivity decreases and a thermal conductivity increases as sputtering is performed at a lower pressure.

An impurity composition or crystallinity in a film also depends on a method of producing an alloy target used for sputtering and a sputtering gas (Ar, Ne, Xe, etc). Thus, a volume resistivity of a thin film state is not defined only by a metal material and composition. In order to acquire a high thermal conductivity, it is preferable to lessen an amount of impurities as mentioned above. However, on the other hand, since pure metal such as Al or Ag tends to be inferior in a corrosion resistance and a hillock resistance, it is necessary to determine an optimum composition in consideration of a balance of both.

In order to acquire a higher thermal conductivity and reliability, it is effective to make the reflective layer in a multilayer structure. In this case, at least one layer is formed of the above-mentioned high thermal conductivity material (low volume resistivity material) having a film thickness of equal to or grater than 50% of a total film thickness and substantially contributes to a heat radiation effect, and other layers contribute to an improvement in a corrosion resistance and an adhesive nature with the protective layer and a hillock resistance.

Specifically, when using Ag, which has a highest thermal conductivity and a lowest volume resistivity among metals, if S is contained in the protective layer adjacent to Ag, a corrosion by S tends to occur and there is a tendency that deterioration when overwrite (O/W) is repeated is slightly fast. Additionally, corrosion tends to occur under an acceleration test environment with a high temperature and a high humidity.

Then, when using Ag or an Ag alloy as a low volume resistivity material, although not shown in the figure, it is effective to provide an Al alloy layer having a thickness of 1 to 100 nm as an interface layer between the Ag or Ag alloy layer and the adjacent protective layer. As for the Al alloy, a material the same as that mentioned in relation to the reflective layer 2 can be used. If the thickness of the interface layer is smaller than 1 nm, a protection effect is not sufficient. If the thickness exceeds 100 nm, a heat radiation effect is sacrificed. Additionally, if the thickness is equal to or larger than 5 nm, the layer does not have an island structure, which tends to achieve a uniform formation.

Further, if an Ag alloy heat release layer and an Al alloy interface layer are used, it is preferable to provide an interface oxidation layer by oxidizing the Al surface by a thickness equal to or larger than 1 nm since mutual diffusion tends to occur in the combination of Ag and Al. It should be noted that if the thickness of the interface oxidation layer exceeds 5 nm, especially, 10 nm, the layer serves as a thermal resistance, and it is not preferable since the original function of the heat release layer that a heat radiation effect is extremely high is deteriorated.

It is also possible to measure each thermal conductivity directly in order to specify the reflective layer 2 and the heat release layer 8 having a high thermal conductivity that show a good characteristic in the present invention, and it can be estimated whether or not the thermal conductance is good by using an electric resistance. In a material such as a metal film in which mainly electrons control conduction of heat or electricity, there is a good relationship between a thermal conductivity and an electric conductivity. An electric resistance of a thin film is represented by a resistivity value standardized by a film thickness or an area of a measuring area. The volume resistivity and the area resistivity can be measured by a normal four probe method which is specified by Japanese Industrial Standard JIS N 7194. According to the method, data having good repeatablility can be obtained mush easier than measuring a thermal conductivity of a thin film.

As a preferable characteristic of the reflective layer 2 and the heat release layer 8, the volume resistivity is 20 to 150 n$\Omega$·m, and preferably 20 to 100 n$\Omega$·m. It is difficult practically to form a material having a volume resistivity smaller than 20 n$\Omega$·m in a thin film state. Additionally, in a case where the volume resistivity is greater than 150 n$\Omega$·m, the area resistivity can be reduced by making the film thick to have a thickness exceeding 300 nm, for example. However, according to consideration of the inventors, decreasing only the area resistivity of such a high volume resistivity material cannot provide a sufficient heat radiation effect since a thick film increases a heat capacity per unit area. Additionally, formation of such a thick film takes a long time and a material cost is increased, and, thus, it is not preferable in a view point of a manufacturing cost. Further, increasing the film thickness may deteriorate the microscopic flatness of the surface of the film. It is preferable to use a low volume resistivity material which can provide an area resistivity of 0.2 to 0.9 $\Omega$/□, and more preferably 0.5 $\Omega$/□.

The above-mentioned multilayering of the reflective layer 2 or the heat release layer 8 is effective in obtaining a desired area resistivity with a desired film thickness by combining a high volume resistivity material and a low volume resistivity material. An adjustment of a volume resistivity by alloying can simplify a sputtering process by using an alloy target. However, it causes an increase in a target cost, and subsequently an increase in a raw material ratio of a medium. Accordingly, it is also effective to acquire a desired volume resistivity by multilayering a thin film of pure Al, pure Ag and pure Au and a thin film of the above-mentioned additive elements. If a number of layers is up to around three, an initial apparatus cost may be increased but a medium cost may be decreased. It is preferable that the reflective layer has a multilayer structure including a plurality of metal films and a total film thickness is 40 to 300 nm, and more than 50% of the total film thickness is a metal thin film layer (may be a plurality of layers) having a volume resistivity of 20 to 150 n$\Omega$·m.

When using a high NA objective lens in the structure where the cover substrate 12 is made thin as shown in FIG. 2, the cover substrate 12 is preferably a sheet material since the thickness of the cover substrate 12 is preferably equal to or smaller than 0.3 mm, more preferably 0.6 mm. If NA is 0.50 to 0.7, the cover substrate 12 having a thickness of 0.6 mm may be used.

As a material of the cover substrate 12, a polycarbonate resin, an acrylic resin, an epoxy resin, a polystyrene resin, an acrylonitrile-styrene copolymer resin, a polyethylene resin, a polypropylene resin, a silicone resin, a fluorocarbon resin, an ABS resin, a urethane resin, etc., can be used, and the polycarbonate resin and the acrylic resin are preferable since they are excellent in an optical characteristic and cost.

As a method of forming the thin cover substrate using a transparent sheet made of those materials, there is a method in which a transparent sheet is applied via an ultraviolet (UV) curable resin or a transparent both-sided pressure sensitive sheet. Additionally, the thin cover substrate may be formed by applying an ultraviolet (UV) curable resin onto a protective layer. The above-mentioned resin can be used for the resin intermediate layer and the adhesive layer, but the UV curable resin is preferable since it is excellent in cost.

Although the present invention is explained below in detail by showing examples and comparative examples, the present invention is not limited to the examples.

Here, the second recording structure layer (hereinafter, referred to as "L0 layer") 200 has a structure in which both transmission and absorption are satisfied since it must transmit a light therethrough and also absorb the light to perform recording. On the other hand, the first recording structure layer (hereinafter, referred to as "L1 layer") 100 is desired to have a high recording sensitivity since an amount of light reaching the L1 layer 100 is smaller by an amount corresponding to an amount of absorption of the L0 layer 200 as compared to a single layer medium.

Accordingly, the present inventors prepared a phase-change type optical recording medium having the layer structure as shown in FIG. 2. The substrate 1 was made of polycarbonate having a thickness of 0.6 mm. The reflective layer 2 had a composition of $Ag_{97}Cu_1Pt_1Pd_1$. The first protective layer 3 was a mixture layer of SnOx and TaOx. The first recording layer 4 had a composition of $Ag_5In_5S_{65}Te_{25}$. The second protective layer 5 was made of $ZnS.SiO_2$. The resin intermediate layer 6 was made of a UV curable resin (Catalog No. SD318 manufactured by Mitsubishi Material Company). The third protective layer was made of IZO. The heat release layer 8 was made of $C_{99}Mo_1$. The fourth protective layer was made of $ZnS.SiO_2$. The second recording layer 10 had a composition of $Ge_5In_{20}Sb_{75}$. The fifth protective layer 11 was formed of a mixture layer of SnOx and TaOx. The cover substrate 12 was made of polycarbonate. It should be noted that the layers other than the resin intermediate layer 6 having a thickness of 35 μm and the cover substrate 12 having a thickness of 0.6 mm were formed by a sputter method while controlling a film thickness.

Specifically, a depth of a groove of the L0 layer 200 was 240 Å, a half value width was 0.3 μm, and a reflectance was set to 5.5%. A depth of a groove of the L1 layer 100 was 270 Å, a half value width was 0.29 μm, and a reflectance was set to 6.0%. The L0 layer 200 and the L1 layer 100 were formed by sputtering on an injection molded polycarbonate substrate having a track pitch of 0.74 μm and a thickness of 0.6 mm, and applied together by an UV curable resin (UV irradiation was made from the side having a high transmittance). At that time, the present inventors prepared a plurality of phase-change type optical recording media by varying the film deposition condition of the L0 layer.

FIG. 4 is an illustration showing film deposition conditions of sample discs prepared by the present inventors.

For example, as shown in FIG. 4, in the present examples, the fifth recording layer 11 of the L0 layer 200 was formed with a film thickness of 200 nm or 220 nm, and the second recording layer 10 was formed of a composition of $In_{15}Sb_{80}Ge_5$ with a film thickness of 7 nm or 8 nm. Then, the fourth protective layer 9 made of a mixture oxide of AnOx and TaOx was formed with a film thickness of 20 nm, and, thereafter, the heat release layer 8 made of Cu was formed with a film thickness of 7 nm or 8 nm, and further the third protective layer 7 was formed with a film thickness of 70 nm to 110 nm. It should be noted that those film thicknesses were varied so as to equalize the transmittance when the disc was formed by a dual-layer structure.

For example, the sample number L0J was a disc having the L0 layer 200 using 0.575 mm substrate (a polycarbonate substrate having a thickness of 0.6 mm±0.05 mm with NA=0.6 or NA=0.65), and the fifth protective layer 11 having a film thickness of 220 nm, the second recording layer 10 having a film thickness of 8 nm, the fourth protective layer 9 having a film thickness of 20 nm, a heat release layer 8 having a film thickness of 8 nm, and the third protective layer 7 having a film thickness of 70 nm were formed on the L0 layer 200.

At this time, L1 layer 100 was formed using a 0.575 mm substrate, and an Ag layer as the reflective layer 2 having a thickness of 140 nm, a mixture layer of SnOx and TaOx having a film thickness of 20 nm as the first protective layer 3, a composition of $Ge_5Ag_2In_2Sb_{71}Te_{20}$ having a thickness of 15 nm as the first recording layer 4, and a $ZnS.SiO_2$ layer having a thickness of 120 nm as the second protective layer 5 were formed in that order on the L1 layer 100 using a sputtering apparatus. It should be noted that the L1 layer 100 may have the same structure as a single layer medium such as, for example, a DVD+RW 2.4× or a DVD+RW 4×, and thus, in the present examples, the above-mentioned film deposition condition of the L1 layer 100 was fixed and the film deposition condition of the L0 layer 200 was varied.

It should be noted that, in FIG. 4, the substrate thickness (1) indicates 0.575 mm, the substrate thickness (2) indicates 0.6 mm, and the substrate thickness (3) indicates 0.61 mm. Additionally, since the fifth protective layer 11 is thick and has a film thickness of 200 nm or 220 nm and a thermal deformation occurs when producing by a single sputter cathode, the fifth protective layer 11 was formed using a cathode 1 and a cathode 2 and dividing into four times as shown in FIG. 4.

FIG. 5 is an illustration showing a reflectance, a modulation and a value of a product (R×M) of those of a disc produced according to the film deposition condition shown in FIG. 4. FIG. 6 is an illustration showing a result of evaluations as to whether or not focusing, tracking (push-pull) and reproduction of the disc produced according to the film deposition condition shown in FIG. 4 can be made.

As appreciated from FIGS. 5 and 6, the focusing and tracking can be made if the reflectance of each of the recording structure layers 100 and 200 is equal to or grater than 2%. On the other hand, it was found that a Differential Phase Detection (DPD) reproduction, which is a reproduction method of a DVD player, is possible when a value of a product (R×M) of a reflectance of a high reflection part and a modulation of each of the recording structure layers 100 and 200 was equal to or greater than 2.8. That is, it was found that if the product (R×M) of the reflectance of the high reflection part and the modulation of the phase-change type optical recording medium after recording is set to a value equal to or greater than a lower limit value (2.8), a reproduction can be made. More specifically, it was found that if the product of the reflectance of the high reflection part and the modulation is set to a value equal to or greater than the lower limit value (2.8) by varying the film deposition condition of the L0 layer 200 which is the second recording structure layer, a phase-change type optical recording medium having a dual-layer structure can be achieved.

Figure 7:
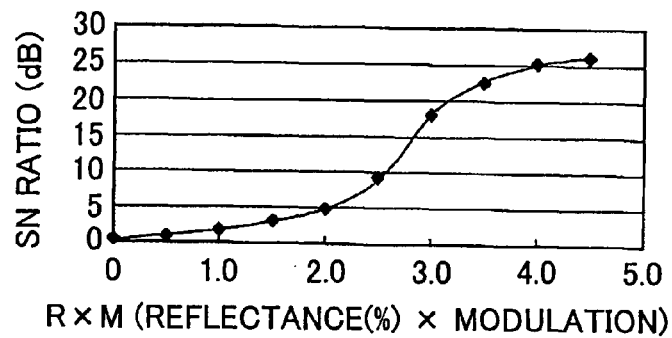
FIG. 7 is a graph showing a relationship between an S/N ratio and a product of a reflectance of a high-reflection part and a modulation.

This is because if the product (R×M) of the reflectance of the high reflection part and the modulation of each of the recording structure layers 100 and 200 after recording, an S/N ratio of a signal read from the phase-change type optical recording medium by a pickup is improved as shown in FIG. 7, and a reproduction possible level is reached when the product (R×M) of the reflectance and the modulation becomes 2.8.

In the meantime, in a case where a disc has a dual-layer structure and a red LD (wavelength corresponding to a DVD) is used, if an energy density is low, it is necessary to produce a rapid cooling structure on the recording medium side since a rapid cooling cannot be achieved when recording unlike a case where a blue wavelength is used and NA is large (NA=0.85). However, in a case of a dual-layer structure, since the transmittance of the heat release layer 8 must be 40% to 50%, it is difficult to form a sufficient metal heat release layer like a single-layer medium.

An Al alloy or an Ag alloy (including pure Ag) can be formed with a thickness of 100 nm in a conventional single-layer medium, while an Al alloy or an Ag alloy (including pure Ag) cannot be formed with a thickness of 5 nm to 10 nm due to a transmittance in the red wavelength of a DVD, and, thus, a heat radiation is insufficient.

Figure 8:
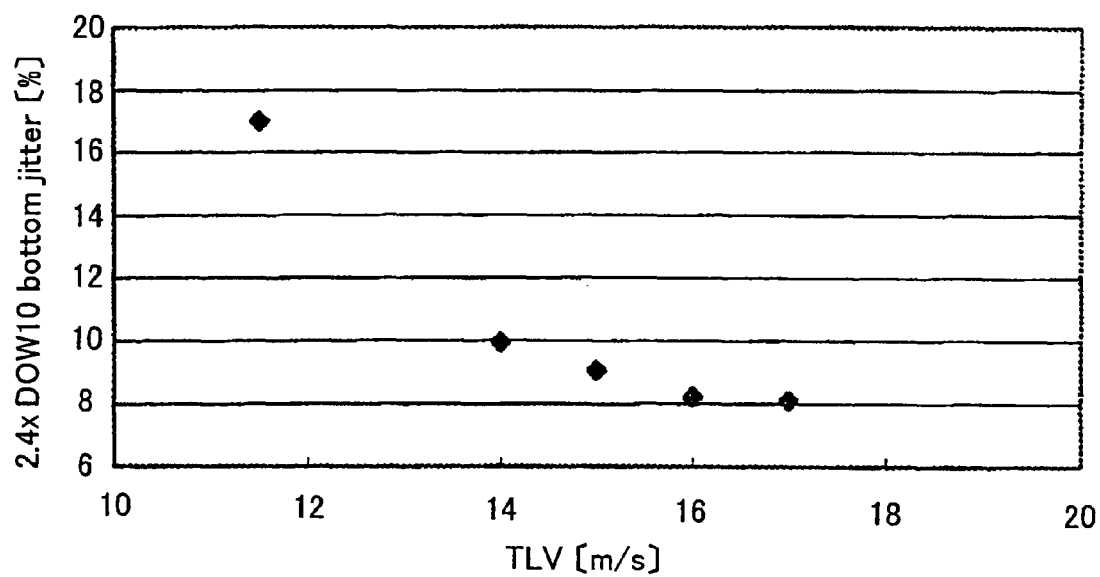
FIG. 8 is a graph showing a relationship between a recording linear velocity and a jitter in a recording layer on a light incident side.

Therefore, the present inventors considered and studied, and found that an amorphous corresponding to a recording linear velocity cannot be formed unless a composition greatly exceeding a normal recording linear velocity is selected as shown in FIG. 8. Specifically, it was found that jitter becomes good by setting the recording linear velocity to a value equal to or higher than about 15 m/sec, which exceeds a normal recording linear velocity of 2.4×(9.2 m/sec).

In a medium such as a conventional single-layer medium (DVD+RW 4×, 8×) in which the film thickness of the reflective layer can be equal to or greater than 100 nm, an amorphous can be easily formed since it is a rapid cooling structure. Thus, a recording layer having a velocity faster than a speed of recording and reproduction characteristic by several m/sec can achieve a good recording and reproduction characteristic. However, since the layer structure on the light incident side of a dual-layer RW medium is translucent, it is much more difficult to form a rapid cooling structure than a single-layer medium. Thus, since it is difficult to form an anamorphous in a crystal state, it is necessary to increase the transition speed of the recording layer itself to about 1.5 times the recording linear velocity.

Here, explaining a method of measuring a transition linear velocity, a crystal level (RF signal level) is measured by applying a DC erase power to a medium after initialized. The power for DC erase is sufficiently larger than an erase power for recording. In a case of DVD, a DC power of 15 mW was irradiated. An amorphous cannot be formed unless the transition linear velocity of the medium is set with respect to the recording linear velocity. Since it is difficult to form an amorphous, normally, a modulation is lower than that of a single-layer medium, and modulation (M)=(RF(crystal)−RF(amorphous))/RF reaches about 0.45 at the maximum.

Additionally, the reflectance is about one-third of that of a single-layer medium, which is about 6%, and the product of the reflectance (R) and the modulation (M) is one of performances of a low reflection medium. Additionally, the reflectances of both layers are not equal to each other in the dual-layer medium, and are 7% and 5% and a total of reflectances of the both layers is 12% to 15% and an average of the reflectances is about 6.75%. As a medium, the reflectance is 5% to 10%. That is, as indicated as the product of the reflectance (R) and the modulation (M) shown in FIG. 7, SN of the system for recording and reproduction is rapidly improved from a point where the value of R×M is about 2.8.

As an index to determine a performance of a medium, a value obtained by multiplying the product of the reflectance (R) and the modulation (M) by a reproduction power (Pr) is effective as a system. This is because if the reproduction light has the same power as a conventional light, R×M is about 25% of that of a conventional single-layer media since the reflectance is about on-third (6% in dual-layer, 18% in single-layer) and the modulation is about three-quarter (0.45 in dual-layer, more than 0.6 in single-layer). Increasing the reproduction light power, an absolute level of modulation amplitude can be raised.

Figure 9:
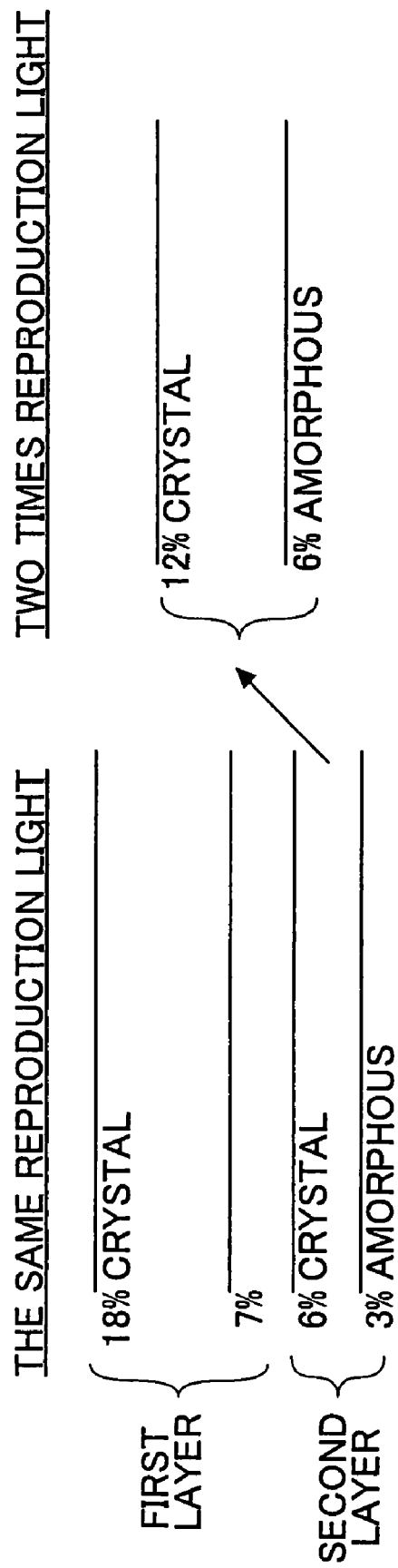
FIG. 9 is an illustration showing a relationship between a crystal and an amorphous when a reproduction light is the same and two times.

In a case of a dual-layer structure, since the transmittance on the light incident side is 40% to 50% as shown in FIG. 9, the film does not deteriorate even if the light having a double power is irradiated. The reproduction light depends on a recording film and a layer structure, and since a difference between a crystal and an amorphous of a medium of which reproduction light can have a high power can be obtained, the SN ratio of the system can be raised.

When the transition linear velocity was varied as 13 m/sec, 14 m/sec 15 m/s, 16 m/sec and 17 m/sec, a Sb/(Sb+Te) ratio was set to 0.68, 0.69, 0.70, 0.71, 0.71, respectively, and the rest was Ge 4%. When a media was produced with a layer structure (other than recording layer composition) being a LOA structure, jitter was best at a transition linear velocity of about 15 m/sec in a case of a recording linear velocity of 2.4×.

Additionally, deterioration of jitter was within 1% even when reproduction of one million times are performed with a reproduction light of 1.3 mW (at 1×), 2 mW (at 2.4×) in any composition. It was found that the system is better as the reproduction light power is higher, and Pr×R×M at 1× is 1.2 mW (±0.1 mW)×2.9%=3.48, which is about a limit.

FIG. 10 is an illustration showing values of a DPD signal (phase difference signal (ΔT/Tw) when a tracking is performed. As a result of experiments, although illustration is omitted, it was found that a DPD tracking can be performed when the value of the DPD signal is equal to or greater than 0.3.

It should be noted that although only the film deposition condition of the L0 layer 200 is varied in the present embodiment, a phase-change type optical recording medium having a dual-layer structure may be achieved by varying the film deposition condition of the L1 layer so as to set the product of the reflectance and the modulation of the high reflection part of each recording structure layer to a value equal to or greater than the lower limit value (2.8).

A description will now be given of a reproduction method of the above-mentioned phase-change type optical recording medium.

Figure 11:
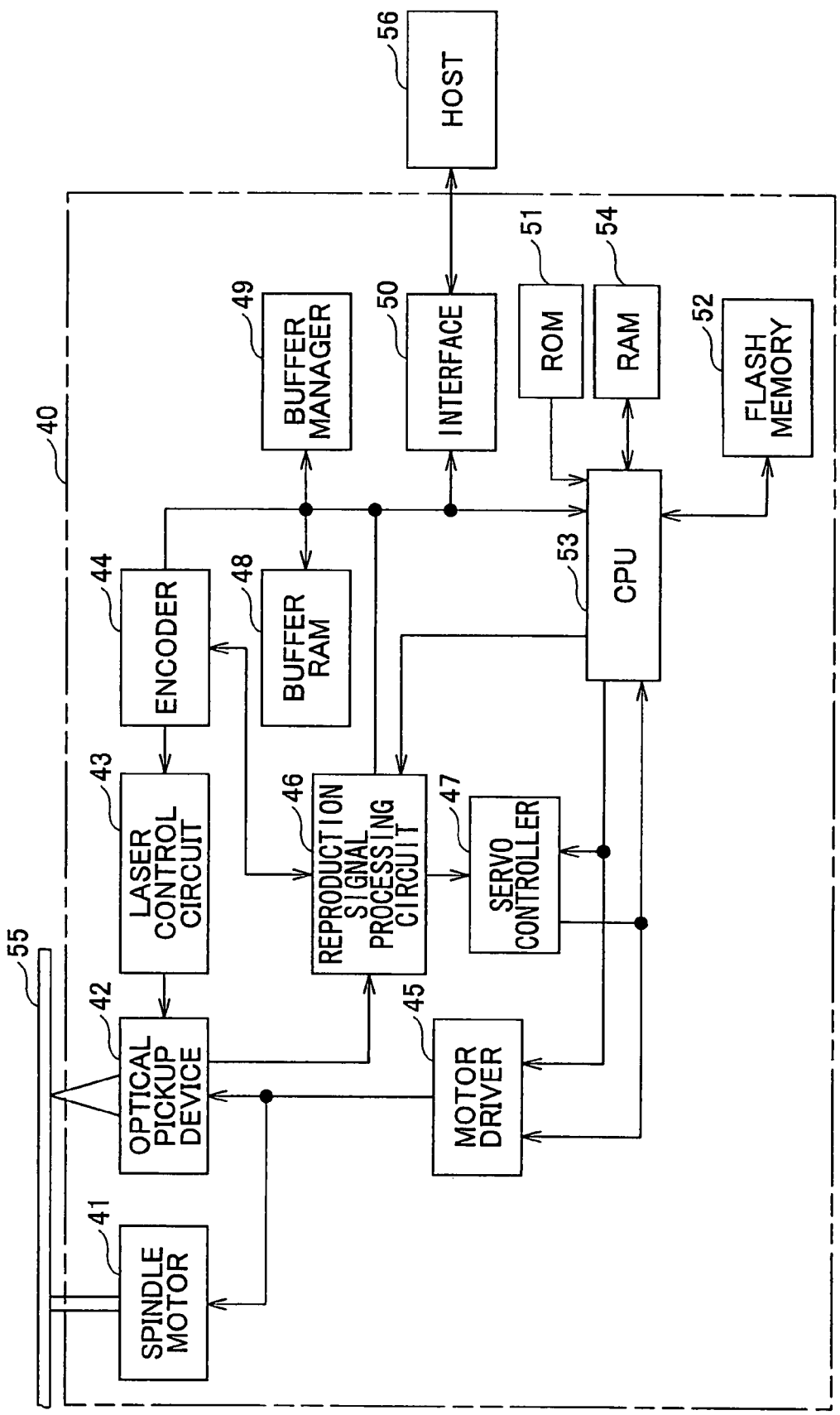
FIG. 11 is a block diagram of an optical disc apparatus, which can reproduce a phase-change type optical recording medium according to the present invention.

FIG. 11 is a block diagram of an optical disc apparatus which can reproduce the phase-change type optical recording medium according to the present embodiment. The optical disc apparatus 40 shown in FIG. 11 comprises a spindle motor 41 for rotationally driving an optical disc 55, an optical pickup device 42, a laser control circuit 43, an encoder 44, a motor driver 45, a reproduction signal processing circuit 46, a servo controller 47, a buffer RAM 48, a buffer manager 49, an interface 50 of a host computer 56, a ROM 51, a flash memory 52 as memory means, a CPU 53, a RAM 54, etc. It should be noted that arrows in FIG. 11 do not show the connection relationship of the components but indicate flow of representative signals and information.

The optical pickup device 42 includes a semiconductor laser emitting a laser light having a wavelength of about 660 nm, an optical system that guides the light beam emitted from the semiconductor laser to a recording surface of the optical disc 55 and also guides a return light beam reflected by the recording surface to a predetermined light-receiving position, a light receiver located at the light-receiving position so as to receive the return light beam, and a drive system (a focusing actuator, a tracking actuator and a seek motor, which are not shown in the figure). The light receiver outputs an electric current (a current signal) corresponding to an amount of received light to the reproduction signal processing circuit 46.

The reproduction signal processing circuit 46 converts the current signal, which is an output of the optical pickup device 42, into a voltage signal, and detects a wobble signal, a reproduction signal and a servo signal (a focus error signal, a track error signal) based on the voltage signal. Then, the reproduction signal processing circuit 46 extracts address information and a synchronization signal, etc., from the wobble signal. The address information extracted here is output to the CPU 53, and the synchronization signal is output to the encoder 44. Further, the reproduction signal processing circuit 46 performs an error correction process on the reproduction signal, and, thereafter, store the reproduction signal in the buffer RAM 48 through the buffer manager 49. Additionally, the reproduction signal processing circuit 46 outputs the servo signal to the servo controller 47. It should be noted that the reproduction signal processing circuit 46 sets a servo parameter (for example, a signal level adjustment gain, etc.) corresponding to a type of the optical disc 55 according to an instruction from the CPU 53.

The servo controller 47 generates a control signal for controlling the optical pickup device 42 based on the servo signal, and outputs the control signal to the motor driver 45. The buffer manager 49 manages input and output of data to the buffer RAM 48, and when an amount of data accumulated reaches a predetermined value, the buffer manager 49 sends a notification to the CPU 53.

Based on the control signal an instruction from the CPU 53, the encoder 44 retrieves the data accumulated in the buffer RAM 48 through the buffer manager 49, and adds an error correction code to the data so as to produce write data for the optical disc 55. Then, based on the instruction of the CPU 53, the encoder 44 outputs the write data to the laser control circuit 43 in synchronization with the synchronization signal from the reproduction signal processing circuit 46.

The laser control circuit 43 controls a laser light output from the optical pickup device 42 based on the write data from the encoder 44. The interface 50 is a bidirectional communication interface with the host (for example, a personal computer, a DVD video recorder backend) 56, and conforms to a standard interface such as ATAPI (AT Attachment Packet Interface), SCSI (Small Computer System Interface), etc.

The ROM 51 stores programs including a program (hereinafter, referred to as "disc distinguish program") which distinguishes a type of an optical disc described by a code readable by the CPU 53. The flash memory 52 is a nonvolatile memory, which maintains recorded contents even when a power is turned off, and is readable or writable by the CPU 53. The CPU 53 controls an operation of each part in accordance with the above-mentioned program stored n the ROM 51, and temporarily stores data necessary for the control in the RAM 34.

It should be noted that when a power of the optical disc device 40 is turned on, the above-mentioned program stored in the ROM 51 is loaded to a main memory (not shown in the figure) of the CPU 53. Additionally, the optical disc device 40 is capable of accessing, as an example, a reproduction only DVD, a recordable DVD±R and a rewritable DVD±RW.

Figure 12:
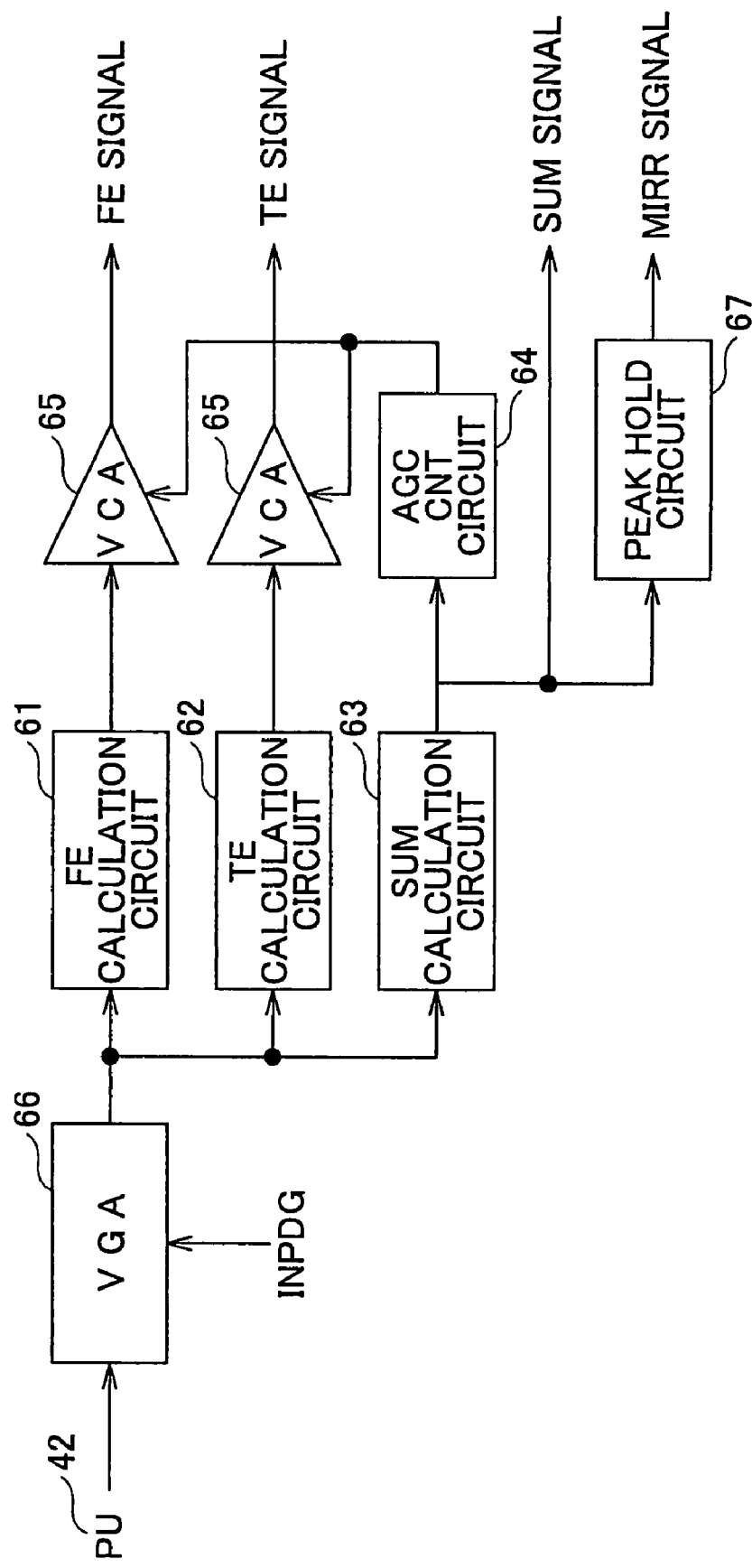
FIG. 12 is a circuit diagram using a preferable AGC method according to the present invention.

FIG. 12 is a circuit diagram using a preferable AGC method according to the present invention.

Signals VA, VB, VC and VD from the optical pickup device 42 (PU 42) are arbitrarily multiplied by a gain by a variable gain amplifier (VGA) 66. The gain Ginpd can be set according to an instruction from the CPU 53, and can be set by an INPDG control signal.

As for the focal error signal, an operation of FE=Ginpdx [(A+C)−(B+D)] is performed by an FE calculation circuit 61. As for the track error signal, an operation of TE=Ginpdx [(B+C)−(A+D)] is performed by a TE calculation circuit 62. As for a sum signal, an operation of SUM=Ginpdx (A+B+C+D) is performed by a SUM calculation circuit 63. A normalization circuit includes an AGCCNT circuit 64 and VCAs 65. A gain of each of the VCA 65 (VCA gain) is set so that a level of the SUM signal input to the AGCCNT circuit 64 is equal to a certain value, here, 0.5 V. When the level of the SUM signal is 0.5 V, the VCA gain is four times. When the level of the SUM signal is 0.5 V, the VCA gain is two times. When the level of the SUM signal is 0.1 V, the VCA gain is one time. That is, the TE signal and the FE signal are multiplied by G=1/SUM.

The gain of each of the VCAs 65 for the TE signal and the FE signal is represented by GAIN=1/SUM, and an AGC operation of the FE signal and the TE signal is carried out as follows at this time.

$$FEn=[(A+C)-(B+D)]/(A+B+C+D)$$

$$TEn=[(B+C)-(A+D)]/(A+B+C+D)$$

Although the gain range of each of the VCAs 65 covers a range from 0.7 to 5.6 times (−3 dB to +15 dB) practically, it is desirable to use at +6 dB as a center. Therefore, what is necessary is to set INPDG so that the gain of the VGA 66 becomes equal to +6 dB. The gain range of the VGA 66 also covers a range from 0.7 to 5.6 times (−3 dB to +15 dB) practically.

Figure 13:
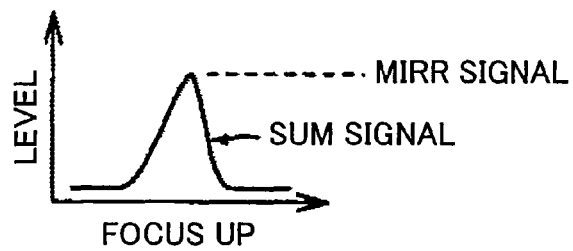
FIG. 13 is a graph showing a SUM signal and a MIRR signal.

When the optical disk 55 is mounted in the drive, an LD is turned on and a focus search is performed to move an objective lens of the PU 42 upward or downward. FIG. 13 shows a SUM signal and an MIRR signal at that time. A peak value of the SUM signal is output by a peak hold circuit shown in FIG. 12 as the MIRR signal. The peak value of the SUM signal corresponds to a case where a spot of the PU 42 is focused on a disc surface, and a mirror surface level of the optical disc 55 is detected.

A level of the MIRR signal is read by the CPU 53 and an AD converter (not shown in the figure) to know the level. If the level is 1.0 V, a setting value of 0.5/1V=0.5=−6 dB is calculated by the CPU 53, and is set to INPDG. At this time, since the output from the PU 42 is multiplied by 0.5 by the INPDG of the VGA 66, the SUM signal when applying a focus must be 0.5 V, which was originally 1 V. Thus, the AGC gain of the VCA 65 at that time must be the center of 1/0.5V=2=6 dB.

Incidentally, if the INPDG is not set up (unchanged at 0 dB), since the SUM signal remains unchanged at 1V, the AGC gain of the VCA 65 is 1/1V=1=0 dB, which is not preferable since it is close to a lower limit of the practical AGC range.

The power of a reproduction light beam from the optical pickup device 42 is about 0.7 mW. In this condition, for example, the MIRR level of a reproduction only DVD having a reflectance of 80% is 0.7 V. Thus, a setting value of 0.5/0.7V=0.7 (corresponding to −3 dB) is calculated by the CPU 53, and is set to the INPDG. At this time, since the output of the PU 42 is multiplied by 0.7 by the INPDG of the VGA 66, the SUM signal when a focus is applied becomes equal to 0.5 V. Thus, the AGC gain of the VCA 65 becomes a center of 1/0.5=2 (corresponding to 6 dB), thereby exhibiting a good servo performance.

The MIRR level of a dual-layer structure DVD ±RW having a reflectance of, for example, 5% is 0.045 V, and, thus, a setting value of 0.5/0.045V=11 (corresponding to 21 dB) is calculated by the CPU 53. However, this value exceeds 12 dB, which is an upper limit of the practical AGC range of the VGA 66. Thus, the power of the reproduction light beam from the light pickup device 42 is set to about 1.4 mW, which is two times the conventional value. At this time, the MIRR level of the dual-layer structure DVD±RW having a reflectance of 5% is 0.09 V. Thus, a setting value of 0.5/0.09V=5.6 (corresponding to 15 dB) is calculated by the CPU 53, and is set to the INPDG. At this time, since the output of the PU 42 is multiplied by 5.6 by the INPDG of the VGA 66, the SUM signal when a focus is applied becomes equal to 0.5 V. Thus, the AGC gain of the VCA 65 becomes a center of 1/0.5=2 (corresponding to 6 dB), thereby exhibiting a good servo performance.

Although it is mentioned that the LD power is about 0.7 mW, an actual value of the LD power may be in a range of 0.5 to 0.9 mW since a control accuracy of the semiconductor laser fluctuates about ±30% containing an initial setting accuracy. Similarly, an actual value of the LD power may be 1.0 to 1.8 mW when the LD power is about 1.4 mW. That is, setting the power of the reproduction light beam from the optical pickup device 42 to about 1.4 mW, which is two times the conventional value, means that the power is set to 1.0 to 1.8 mW.

Figure 14:
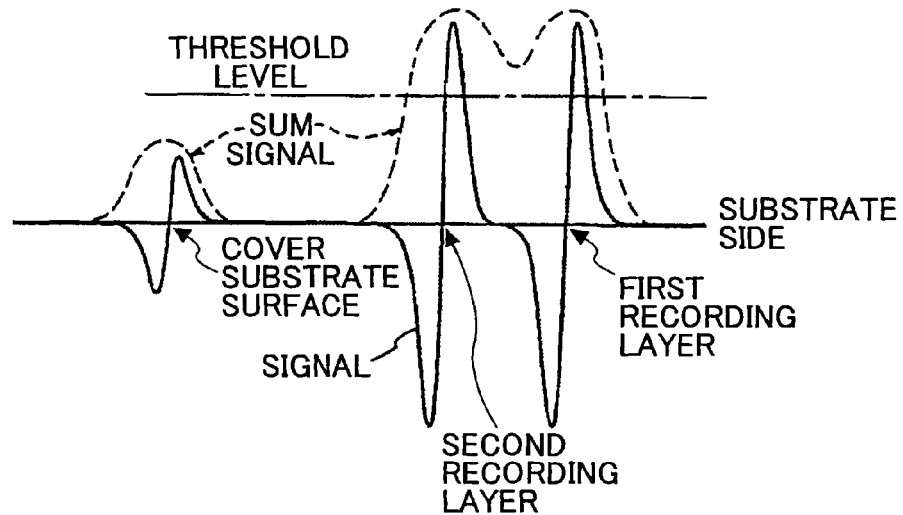
FIG. 14 is an illustration for explaining a conventional focus pull-in method.
Figure 15:
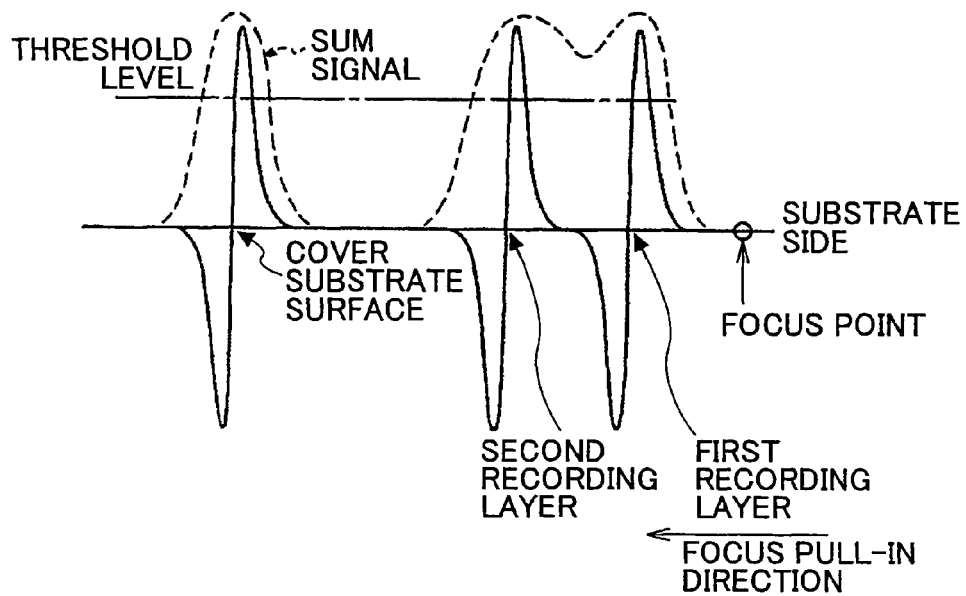
FIG. 15 is an illustration for explaining a focus pull-in method according to the present invention.

A description will now be given, with reference to FIG. 14, of a conventional focus pull-in method. After turning on the LD and moving the objective lens of the PU 42 upward and downward by performing a focus search, the FE signal (focus signal) shown in FIG. 14 is obtained. This signal is for focusing on the first recording structure layer 100 or the second recording structure layer 200. However, since a signal is generated at a surface of the cover substrate 12, the focus is pulled in only when the SUM signal is equal to or higher than a threshold level so as to prevent a focus being erroneously pulled in at the surface of the cover substrate 12. However, in the dual-layer structure DVD±RW, which has a reflectance about one-third of that of a recordable dual-layer DVD±RW, the SUM signal having the same level as that generated by the first recording structure layer 100 and the second recording structure layer 200 may be generated from the surface of the cover substrate 12 as shown in FIG. 15. Thereby, the threshold level to prevent a pull in of a focus at the surface of the cover substrate 12 cannot be set. Thus, a pull in of a focus is performed in a direction moving from the first recording structure layer 100 to the second recording structure layer 200.

Additionally, a pull in of a focus can be quick if a focal point (shown in FIG. 12) of a light beam outgoing from the objective lens of the optical pickup device 42 is located on the substrate 1 side of the first recording layer 4, that is, beyond the first recording layer 4.

It should be noted that there is provided according to the present embodiment a processor readable recording medium storing a program causing a computer to perform the above-mentioned reproduction method and a computer readable reproduction program causing a computer to perform the above-mentioned reproduction method.

Figure 16:
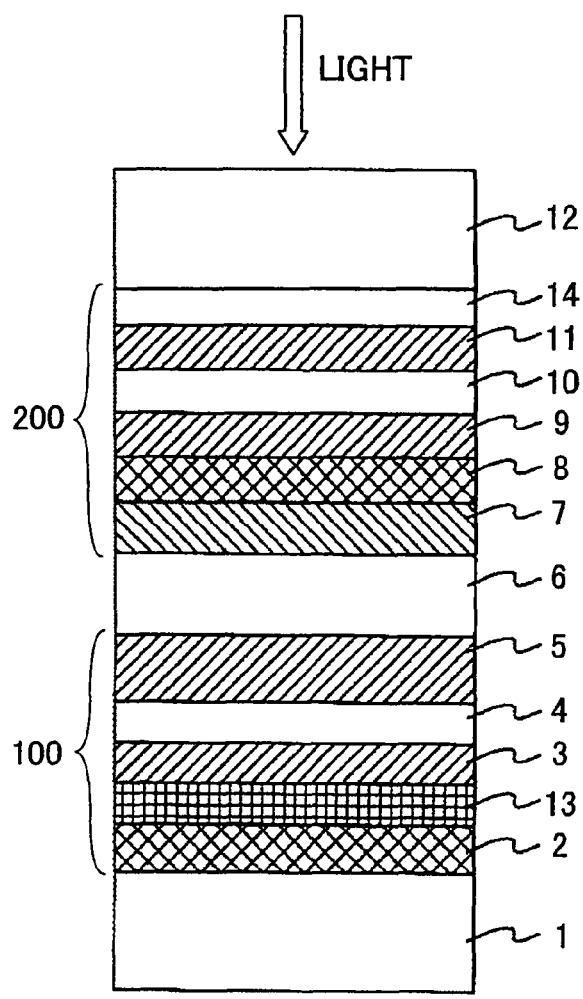
FIG. 16 is an illustration of a cross section of a layer structure of a phase-change type optical recording medium according to a second embodiment of the present invention.

A description will now be given of a phase-change type optical recording medium according to a second embodiment of the present invention. FIG. 16 is an illustration of a cross section of a layer structure of the phase-change type optical recording medium according to the second embodiment of the present invention. In FIG. 16, parts that are the same as the parts shown in FIG. 2 are given the same reference numerals, and description thereof will be omitted.

The phase-change type optical recording medium according to the second embodiment of the present invention has the same structure as the above-mentioned phase-change type optical recording medium according to the first embodiment except for an interface layer 13 and a sixth protective layer 14 being added.

The interface layer 13 is provided between the reflective layer 2 and the first protective layer 3, and is made of TiC-.TiO$_2$. The sixth protective layer 14 is provided between the fifth protective layer 11 and the cover substrate 12, and is made of IZO.

The present invention is not limited to the specifically disclosed embodiments, and variations and modifications may be made without departing from the scope of the present invention.

The present application is based on Japanese priority Applications No. 2005-166268 filed Jun. 6, 2005, No. 2005-166269 filed Jun. 6, 2005, No. 2005-347375 filed Nov. 30, 2005 and No. 2006-01973 filed Jan. 27, 2006, the entire contents of which are hereby incorporated herein by reference.

The invention claimed is:

1. A reproduction method for reproducing information recorded on a rewritable multilayer phase-change type optical recording medium having at least a first recording structure layer, a resin intermediate layer, a second recording structure layer and a cover substrate sequentially formed on a substrate, the method comprising:

setting a first power of a reproduction light beam for use with the rewritable multilayer phase-change type optical recording medium that is higher than a second power of the reproduction light beam for use with a reproduction only multilayer phase-change type optical recording medium;

reproducing information recorded on said first and second recording structure layers of said rewritable multilayer phase-change type optical recording medium using the reproduction light beam having the first power;

setting a start position of a focusing operation of an objective lens of an optical pickup device so that a focal point of a light beam outgoing from the objective lens is beyond a first recording layer of said first recording structure layer; and after setting the start position of the focusing operation, shifting the focal point toward the first recording layer to perform a focal position adjustment.

2. The reproduction method as claimed in claim 1, wherein said first power is set to a value within a range from 1.0 mW to 1.8 mW.

3. The reproduction method as claimed in claim 1, further comprising performing pull-in of a focus in a direction of movement of an objective lens of an optical pickup device from said first recording structure layer to said second recording structure layer.

4. A processor readable recording medium storing a program causing a computer to perform the reproduction method as claimed in claim 1.

5. A reproduction apparatus for reproducing information recorded on a rewritable multilayer phase-change type optical recording medium having at least a first recording structure layer, a resin intermediate layer, a second recording structure layer and a cover substrate sequentially formed on a substrate, the apparatus comprising:

a controller setting a first power of a reproduction light beam for use with the rewritable multilayer phase-change type optical recording medium that is higher than a second power of the reproduction light beam for use with a reproduction only multilayer phase-change type optical recording medium; and an optical pickup device irradiating said reproduction light beam having the first power onto said rewritable multilayer phase-change type optical recording medium so as to reproduce information recorded on said first and second recording structure layers, wherein said controller sets a start position of a focusing operation of an objective lens of said optical pickup device so that a focal point of a light beam outgoing from the objective lens is beyond a first recording layer of said first recording structure layer and then shifts the focal point toward the first recording layer of said first recording structure layer to perform a focal position adjustment.

6. The reproduction apparatus as claimed in claim 5, wherein said first power is set to a value within a range from 1.0 mW to 1.8 mW.

7. The reproduction apparatus as claimed in claim 5, wherein said optical pickup device performs pull-in of a focus in a direction of an objective lens provided therein moving from said first recording structure layer to said second recording structure layer.

* * * * *